(12) United States Patent
Brück et al.

(10) Patent No.: US 7,986,870 B2
(45) Date of Patent: Jul. 26, 2011

(54) METHOD AND DEVICE FOR PROVIDING A GASEOUS SUBSTANCE MIXTURE

(75) Inventors: Rolf Brück, Bergisch Gladbach (DE); Marc Brugger, Neunkirchen (DE); Thomas Härig, Neunkirchen-Seelscheid (DE); Peter Hirth, Rösrath (DE); Ulf Klein, Neunkirchen-Seelscheid (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 236 days.

(21) Appl. No.: 12/271,943

(22) Filed: Nov. 17, 2008

(65) Prior Publication Data
US 2009/0107125 A1    Apr. 30, 2009

Related U.S. Application Data

(63) Continuation of application No. PCT/EP2007/004361, filed on May 16, 2007.

(30) Foreign Application Priority Data

May 16, 2006    (DE) .......................... 10 2006 023 146

(51) Int. Cl.
*F24C 1/00* (2006.01)
*F24C 11/00* (2006.01)

(52) U.S. Cl. ...................................... 392/307; 423/212

(58) Field of Classification Search ............. 392/307
See application file for complete search history.

(56) References Cited

U.S. PATENT DOCUMENTS

| 6,077,491 | A | 6/2000 | Cooper et al. |
| 2004/0115110 | A1 | 6/2004 | Ripper et al. |
| 2005/0013756 | A1 | 1/2005 | Amou et al. |

FOREIGN PATENT DOCUMENTS

| DE | 42 00 514 A1 | 7/1993 |
| DE | 198 45 944 A1 | 6/1999 |
| DE | 199 13 462 A1 | 9/2000 |
| DE | 101 54 421 A1 | 5/2003 |
| DE | 203 08 348 U1 | 7/2004 |
| EP | 1 481 719 A2 | 12/2004 |
| JP | 8-57258 A | 3/1996 |
| WO | 98/42623 A1 | 10/1998 |
| WO | 99/56858 A2 | 11/1999 |
| WO | 2005/025725 A1 | 3/2005 |
| WO | 2006/025110 A1 | 3/2006 |

OTHER PUBLICATIONS

International Search Report, dated Aug. 30, 2007.

*Primary Examiner* — Thor S Campbell
(74) *Attorney, Agent, or Firm* — Laurence A. Greenberg; Werner H. Stemer; Ralph E. Locher

(57) ABSTRACT

A device and a method for providing a gaseous substance mixture including at least one of a reducing agent and/or a reducing agent precursor, include a reservoir for an aqueous solution including at least one reducing agent precursor, from which the aqueous solution can be delivered into at least one metering line having a dispensing opening by a delivery device, and a device for heating the metering line above a critical temperature greater than the boiling temperature of water. Complete evaporation of an aqueous solution including urea and subsequent hydrolysis to form a substance mixture including ammonia, are carried out. The substance mixture is metered as a reducing agent into an SCR catalytic converter. Carrying out the evaporation outside the exhaust system uses considerably smaller hydrolysis catalytic converters, which is space-saving and cost-saving compared to conventional devices for providing a reducing agent for selective catalytic reduction of nitrogen oxides.

21 Claims, 12 Drawing Sheets

US 7,986,870 B2

METHOD AND DEVICE FOR PROVIDING A GASEOUS SUBSTANCE MIXTURE

CROSS-REFERENCE TO RELATED APPLICATIONS

This is a continuation, under 35 U.S.C. §120, of copending International Application No. PCT/EP2007/004361, filed May 16, 2007, which designated the United States; this application also claims the priority, under 35 U.S.C. §119, of German Patent Application DE 10 2006 023 146.5, filed May 16, 2006; the prior applications are herewith incorporated by reference in their entirety.

BACKGROUND OF THE INVENTION

Field of the Invention

The present invention relates to a method and a device for providing a gaseous substance mixture which includes a reducing agent and/or a reducing agent precursor. The method according to the invention and the device according to the invention can advantageously be used, in particular, for metering-in reducing agents for the reduction of nitrogen oxides in the exhaust gas of internal combustion engines.

The emission into the environment of substances contained in the exhaust gas from internal combustion engines, is undesirable. In many countries, for example, nitrogen oxides ($NO_x$) may only be contained in the exhaust gas of an internal combustion engine up to a certain limit value. In addition to engine-internal measures, through the use of which the emissions of nitrogen oxides can be reduced through the use of a selection of a suitable operating point of the internal combustion engine, after treatment methods have been established which make a further reduction of the nitrogen oxide emissions possible.

One option for further reducing the nitrogen oxide emissions is so-called selective catalytic reduction (SCR). In that case, a selective reduction of the nitrogen oxides to molecular nitrogen ($N_2$) takes place by using a reducing agent. One possible reducing agent is ammonia ($NH_3$). In that case, ammonia is often stored not in the form of ammonia but instead, an ammonia precursor is stored, which is converted to ammonia when required. Possible ammonia precursors are, for example, urea (($NH_2$)$_2$CO), ammonium carbamate, isocyanic acid (HCNO), cyanuric acid and the like. Urea, in particular, has proven to be simple to store. Urea is preferably stored in the form of a urea/water solution. Urea and, in particular, urea/water solution is hygienically harmless, simple to distribute and to store. A urea/water solution of that type is already marketed under the name "AdBlue".

German Published, Non-Prosecuted Patent Application DE 199 13 462 A1 discloses a method in which a urea/water solution is dosed, upstream of a hydrolysis catalytic converter, into a partial flow of the exhaust gas of an internal combustion engine. During operation, as it impinges on the hydrolysis catalytic converter, the urea is hydrolyzed and thermolyzed to form ammonia, which is used as a reducing agent in an SCR catalytic converter situated downstream. The method described therein has the disadvantage that the hydrolysis catalytic converter is cooled by the evaporation of the urea/water solution. In particular, where large quantities of ammonia are required, it is possible at least in regions of the hydrolysis catalytic converter, for such intense cooling to take place that, in that case, the hydrolysis reaction no longer takes place or no longer takes place completely.

SUMMARY OF THE INVENTION

It is accordingly an object of the invention to provide a method and a device for providing a gaseous substance mixture, which overcome or at least alleviate the hereinafore-mentioned disadvantages of the heretofore-known methods and devices of this general type.

With the foregoing and other objects in view there is provided, in accordance with the invention, a device for providing a gaseous substance mixture including at least one of the following substances:
a) at least one reducing agent, and/or
b) at least one reducing agent precursor. The device comprises a reservoir for an aqueous solution which includes at least a reducing agent precursor, and at least one metering line with a dispensing opening. A delivery device is provided for delivering the aqueous solution from the reservoir into the at least one metering line, and a device is provided for heating the at least one metering line above a critical temperature which is greater than the boiling temperature of water.

In this case, a reducing agent is to be understood to be a reducing agent which can be used within the context of the selective catalytic reduction of nitrogen oxides. A reducing agent is, in particular, ammonia. A reducing agent precursor is to be understood to mean a substance which cleaves to a reducing agent or reacts with other substances while giving off a reducing agent. An ammonia precursor, such as for example urea, can for example, cleave to ammonia or react while giving off ammonia. An aqueous solution is to be understood to mean the solution of the reducing agent precursor in water, with it being possible for the aqueous solution to include further substances. The dispensing opening is to be understood to mean the opening, out of which the gaseous substance mixture is dispensed. The critical temperature is, in particular, the temperature from which complete evaporation of the aqueous solution takes place. Completely means in this case, in particular, that at least 90% by weight of the aqueous solution is evaporated, preferably at least 95% by weight, particularly preferably at least 98% by weight. The critical temperature is, in particular, above 300° C., preferably above 350° C. or even above 400° C., in particular, at approximately 420° C. or 450° C. It is preferably possible, where relatively large quantities of vapor are required, for a plurality of metering lines to be provided, for example in exhaust systems of trucks or utility vehicles. A metering line is to be understood to mean a traversable volume which is delimited by walls. The metering line can, in particular, be a type of tube or else a duct which is delimited by walls. In this case, the duct can also be provided in a larger component.

The device according to the invention advantageously permits the evaporation of an aqueous solution of a reducing agent precursor, for example of a urea/water solution. During the evaporation, both an evaporation of the reducing agent precursor and, depending on the selected temperature, thermolysis at least of parts of the reducing agent precursor to form reducing agent, take place. In particular, a hydrolysis catalytic converter is provided downstream of the metering line which promotes the conversion of the reducing agent precursor to the reducing agent. The hydrolysis catalytic converter is, in particular, disposed in a body common with the metering line. This facilitates maintenance of the temperature of the metering line and/or the hydrolysis catalytic converter as thermal conduction takes place from the metering line to the hydrolysis catalytic converter and vice versa. In particular, this common body and thus the metering line and the hydrolysis catalytic converter are heatable by one or more heating elements including at least one electric heating resistor. The device according to the invention can particularly advantageously be part of an SCR catalytic converter system which serves to reduce the nitrogen oxide component in the exhaust gas of internal combustion engines. The device according to the invention is particularly preferably used in the exhaust systems of motor vehicles such as for example automobiles, motorized two-wheeled vehicles, water vehicles and aircraft.

A delivery line can be provided between the reservoir and the heatable metering line. The delivery line is unheated or its temperature is controlled to a temperature below the critical temperature. It has proven to be particularly advantageous for a delivery line of that type to be heated up to 80° C. The regulation of the temperature of the delivery line and of the metering line and if appropriate of the hydrolysis catalytic converter provided downstream can advantageously be carried out separately or in a common regulating loop.

According to one advantageous embodiment of the device according to the invention, the delivery device includes a pump.

The pump, in particular, also serves to dose the aqueous solution, that is to say to proportionally meter the aqueous solution into the metering line. A dosing pump is preferably provided in this case as the delivery device. In this case, a dosing pump is to be understood as a pump allowing the metering of a defined volume per time unit or per stroke. The dosing pump has, in particular, a maximum dosing capacity of up to 125 ml/min, in particular up to 30 ml/min. The dosing pump allows a continuous flow rate fluctuating about up to 5% around a nominal value of the flow. The dosing pump, in particular, allows back-conveying towards the reservoir, in particular with flow rates similar to the usual conveying flow rate. The dosing pump allows, in particular, a conveying pressure up to 6 bar absolute, in particular up to 2 bar absolute.

According to a further advantageous embodiment of the device according to the invention, a valve for dosing the quantity of aqueous solution is provided between the delivery device and the metering line.

In an embodiment of that type, a pump can permanently keep the aqueous solution under a predetermined or predefinable pressure, with it being possible for the dosing to take place by opening and closing the valve.

According to an advantageous embodiment of the device according to the invention, the device for heating also advantageously includes at least one of the following elements:
 a) an electrical resistance heater;
 b) a heat transfer device for utilizing the waste heat of at least one other component;
 c) at least one Peltier element; and
 d) a device for burning a fuel.

Another component is to be understood in this case to mean a component which is, for example, part of a motor vehicle and which preferably has a temperature above the critical temperature. These can, for example, be parts of the exhaust line or of the exhaust system, in particular catalyst carrier bodies. These can also be components which are traversed by a heat-exchanging medium such as oil, or the like. An electrical resistance heater is to be understood to mean a conventional heater which is based on the generation of ohmic heat. In particular, it is to be understood that an electrical resistance heater can include at least one heating element made of a material having a positive temperature coefficient (PTC). It is to be understood that a material having a positive temperature coefficient, a so-called PTC-resistor, is in particular an electro-conductive material, the electric resistance of which increases with increasing temperature. These are in use, in particular, as so-called self-regulating heating elements and are, in particular, made of a ceramic material, in particular a barium titanate ceramic. Alternatively, PTC resistors made of a polymeric material, in particular, being doped with soot particles, can be used.

A Peltier element is to be understood, in particular, as an electrical component which, when a current is passed through it, generates a temperature difference based on the so-called Peltier effect. A Peltier element preferably includes one or more elements made from p-doped and n-doped semiconductor material which are connected to one another alternately through the use of electrically conductive material. The sign of the temperature difference is dependent on the direction of the current flow, so that both cooling and heating can be provided by a Peltier element.

The use of the electrical resistance heater, if appropriate in combination with the utilization of the waste heat of other components, has proven to be particularly advantageous. The electrical resistance heater makes it particularly advantageously possible to construct a highly dynamic regulating circuit in which the quantity of gaseous substance which is to be dispensed can be regulated highly dynamically, that is to say in a very quickly-reacting fashion. In particular, the device for heating, for example the resistance heater, is constructed in such a way that it has, in addition to the evaporation enthalpy of the aqueous solution, a capacity buffer for equalizing any heat losses of the device. The resistance heater can, for example, be provided in the manner of at least one heat conductor and/or in the manner of a bar-shaped heating element. Fuel is to be understood, in particular, to mean hydrocarbons and/or hydrogen. The combustion can also take place flamelessly.

According to a further advantageous embodiment of the device according to the invention, the device is constructed in such a way that, in operation, the temperature across the length of the metering line is at most 25° C. above and below a mean temperature.

This is achieved, in particular, through the use of the structural layout of the metering line. The metering line is, in particular, connected to a heat conductor of an electrical resistance heater in such a way that the latter is in contact with the metering line in such a way that the required constancy of the temperature profile can be obtained. This can, for example, be provided in such a way that the metering line is surrounded by closely-wound windings of a heat conductor, or in such a way that the metering line and the heat conductor are wound together, for example to form a spiral. A materially-joined connection is also preferred between the heat conductor and the metering line. This can also be ensured in such a way that the metering line is connected to the delivery line through the use of a connecting unit which minimizes heat losses from the metering line to the delivery line or keeps such heat losses in such a small range that they can be compensated by the resistance heater. It is particularly advantageously possible in this case for a second resistance heater circuit to be provided in the region of the connecting unit between the delivery line and the metering line, in order to be capable of locally compensating for the heat losses which occur depending on the operating state. It is possible in this case, in particular, for a heat conductor with a varying diameter to be used, so that a higher dissipation of heat takes place in the region adjacent the connecting unit than in further remote regions of the metering line. It is also particularly advantageously possible for basic heating to be obtained by contact, for example with the exhaust line. The contact is formed, in particular, of a heat-conducting contact through the use of a heat conductor or else in such a way that the corresponding device is connected to, or is attached on, to or in, the exhaust line.

According to a further advantageous embodiment of the device according to the invention, the metering line has a traversable cross section of at most 20 mm$^2$.

The traversable cross section is preferably constant across the length of the metering line. Alternatively, the metering line can have a diameter of 1 to 3 mm when having a circular cross section. These traversable cross sections advantageously permit as complete an evaporation as possible with a relatively low energy input when simultaneously the possibility of blocking the cross section with byproducts is small. The maximum cross section proposed in this case additionally advantageously permits highly dynamic control of the dispensed vapor quantity, so that a device of that type is particularly advantageously suitable for use in exhaust systems of internal combustion engines. The traversable cross section is alternatively or additionally greater than 0.2 mm$^2$. If the cross section is less than the minimum cross section, then the line can become blocked by deposits, which are generated during operation, on the edge of the metering line. Urea can, for example, be deposited there. The blockage of the metering line can, for example, be dissolved again through intensified heating. Depending on the dynamic situation, such intense heating is either not possible, or the reducing agent quantity that is to be dispensed, which results from the then-possible quantity to be dispensed, is too low.

According to a further advantageous embodiment of the device according to the invention, the metering line is formed from a material including at least one of the following materials:

a) copper;
b) aluminum;
c) a nickel-based material;
d) chrome-nickel steel; and
e) noble steel.

Materials, in particular, which permit good heat conduction have proven to be advantageous. In this case, the use of noble steel, chrome-nickel steel and/or nickel-based materials or corresponding alloys has proven to be particularly advantageous, since these materials are largely corrosion-resistant with respect to the solutions composed of reducing agent precursors (for example urea) and also with respect to formic acid. The materials 1.4401, 1.4301, 1.4828, 2.4646, 2.4816 and/or 2.4633 according to the German Industry Standard are particularly preferable, with 2.4816 being particularly preferable. The use of aluminum or materials including aluminum for forming at least the inner surface of the metering line is particularly advantageous. Aluminum oxides formed on the surface promote thermolysis and/or hydrolysis of urea to ammonia so that the conversion rate of the reducing agent precursor to reducing agent advantageously is increased as compared to other materials even without a coating being catalytically active for hydrolysis.

The delivery device according to the invention is particularly preferably a correspondingly constructed pump. The quantity of the aqueous solution which can be evaporated in the metering line can be influenced through the use of the pump. When switching off the device according to the invention, the delivery device can preferably be utilized for a return delivery, for example when the system is switched off, with the rest of the aqueous solution in the metering line which has not been evaporated being delivered back into the reservoir. This particularly advantageously has the result that a dissipation of the reducing agent precursor to the atmosphere is effectively prevented.

The generated quantity of reducing agent is preferably regulated through the use of the regulation of the capacity of the delivery device. Further regulating mechanisms, such as for example the heating power which is to be introduced, the clocking of a valve with which the metering of aqueous solution to the metering line is controlled, and the like, are possible and in accordance with the invention. It is particularly possible in a particularly advantageous way for the regulation of the capacity of the delivery device to be coupled to the regulation of the heating power, in particular in such a way that the heating power is increased for an increased delivery capacity.

According to a further advantageous embodiment of the device according to the invention, the metering line has a length of from 0.1 to 5 m.

The length of the metering line is defined on the basis of the maximum expected delivery capacity, that is to say as a function of the maximum nitrogen oxide concentration in the exhaust gas of the internal combustion engine. The length of the metering line also increases with rising maximum nitrogen oxide concentration. A length of the delivery line of 0.2 to 0.8 m, particularly preferably of 0.5 m, is preferable.

According to a further advantageous embodiment of the device according to the invention, the metering line has a wall thickness of 0.1 to 0.5 mm.

These wall thicknesses have been proven to be particularly advantageous since they permit good heating and at the same time have a sufficiently great heat capacity to ensure that, in the event of an intense rise in the quantity of aqueous solution which is to be evaporated, evaporation initially takes place due to the high heat capacity, until the device for heating the metering line can output a sufficiently high heating power.

According to a further advantageous embodiment of the device according to the invention, the metering line preferably has a heat capacity of at least 150 J/K.

The heat capacities can advantageously serve to compensate for an inertia of the device for heating the metering line in the event of large transients in the heating power. An embodiment is even preferable in which the heat capacity is at least 200 J/K.

The metering line preferably has at least one direction change, in particular by at least 90°. In this way, drops of liquid being accelerated by an expanding volume of gas are disintegrated by striking the wall of the metering line and are further evaporated. Furthermore, at least two of such changes in direction are preferred. The surface roughness $R_Z$ of the metering line is, in particular, in a range of 8 to 12 microns. In this case, the term surface roughness $R_Z$ is to be understood, in particular, as an averaged surface roughness which is collected by the measurement of the distance of the surface to be measured from a reference surface, wherein the respective maximum and minimum value of the distance is measured on five measuring tracks and the differences between these respective values are gathered. The averaged surface roughness is the mean value of these five differences. These surface values of the surface roughness have been found, in particular, to be advantageous since they promote the heat transfer and, consequently, the effectiveness of evaporation increases. The thermal conductivity of the material from which the metering line is made is, in particular, at least 200 W/(m K) (Watt per meter and Kelvin) at 0° C. At least portions of the surface of the metering line include oxides of aluminum, titanium and/or vanadium for promoting the hydrolyses of reducing agent precursor to reducing agent, in particular of urea to ammonia.

According to a further advantageous embodiment of the device according to the invention, the metering line and the device for heating the metering line have, at least in at least one partial region, at least one of the following configurations relative to one another:

a) the metering line and the device for heating the metering line are provided coaxially with respect to one another at least in a partial region;
b) the metering line and the device for heating the metering line are provided concentrically with respect to one another at least in a partial region;
c) the metering line and the device for heating the metering line are provided adjacent one another at least in a partial region;
d) the metering line is provided at least in a partial region so as to be wound around the device for heating the metering line;
e) the device for heating the metering line constitutes, at least in partial regions, a bar-shaped heating element, with the metering line being formed to be wound around the bar-shaped heating element; and
f) the metering line forms a duct in a bar-shaped heating element.

According to a further advantageous embodiment of the device according to the invention, the metering line and the device for heating the metering line are connected to one another in a materially joined fashion at least in partial regions.

The metering line and the device for heating the metering line are, in particular, brazed and/or welded to one another.

According to a further advantageous embodiment of the device according to the invention, the metering line is at least partially provided with a coating which catalyses the hydrolysis of a reducing agent precursor to form a reducing agent.

It is thus possible for a part or the entire metering line to already be used for the hydrolysis of the reducing agent precursor.

According to a further advantageous embodiment of the device according to the invention, the device includes at least one measuring sensor for determining the temperature of the metering line.

The device for heating the metering line, if it includes an electrical resistance heater, can in particular be used for temperature measurement by measuring the resistance. At least one measuring sensor, for example in the form of a thermoresistor, can alternatively or additionally be provided.

According to a further advantageous embodiment of the device according to the invention, the measuring sensor can be connected to a power source.

The measuring sensor can thereby also be used as a resistance heater, for example in the form of an emergency program if the metering line has become blocked. Within the context of the emergency program, the metering line can preferably be heated to a temperature higher than the critical temperature, preferably considerably higher than the critical temperature. In this case, temperatures of 550° C. and more, in particular 600° C. and more, are preferable.

With the objects of the invention in view, there is also provided a method for providing a gaseous substance mixture including at least one of the following substances:

a) at least one reducing agent, and/or
b) at least one reducing agent precursor. The method comprises delivering an aqueous solution of at least a reducing agent precursor from a reservoir into a metering line, and heating the metering line to completely evaporate the aqueous solution to form the gaseous substance mixture.

Complete evaporation is to be understood, in particular, to mean that the aqueous solution or water leaves the metering line predominantly not in the form of droplets. Complete evaporation is to be understood, in particular, to mean that 90% by weight and more, preferably 95% by weight and more, particularly preferably 98% by weight and more of the aqueous solution is evaporated. The reducing agent particularly preferably includes ammonia, and a preferred reducing agent precursor is urea. It is preferably possible, where relatively large quantities of vapor are required, for a plurality of metering lines to be provided, for example in exhaust systems of trucks or utility vehicles.

A method for the selective catalytic reduction of nitrogen oxides in the exhaust gas of an internal combustion engine is also particularly preferable, in which urea is present in an aqueous solution and is delivered from a reservoir into a metering line, with the metering line being heated in such a way that the aqueous solution is substantially completely evaporated to form a gaseous substance mixture including at least one of the following substances:

a) a reducing agent such as, in particular, ammonia and
b) at least one reducing agent precursor such as in particular urea, with the gaseous substance mixture being introduced into the exhaust system upstream of an SCR catalytic converter. A hydrolysis catalytic converter is particularly preferably provided between the metering of the gaseous substance mixture and the SCR catalytic converter.

Within the context of this invention, a catalytic converter is to be understood as a carrier body which has a corresponding catalytic coating. The carrier body is particularly preferably a honeycomb body made from ceramic or metallic material, a correspondingly coated tube, a wire-mesh support or the like. A hydrolysis catalytic converter thereby constitutes a catalyst carrier body which catalyzes the hydrolysis of at least one reducing agent precursor and in particular of urea, in particular has a correspondingly constructed coating. An SCR catalytic converter thereby constitutes a catalyst carrier body which has a coating which catalyzes the selective catalytic reduction of nitrogen oxides.

In this case, it is particularly advantageous if the reducing agent precursor is metered into an aqueous solution which includes further constituents, in particular for reducing the freezing point. The aqueous urea solution can, in particular, include ammonium formate, that is to say the corresponding salt of the formic acid, and/or formic acid. A corresponding solution can be obtained under the trademark "Denoxium".

Depending on the embodiment of the exhaust system in which the method according to the invention is used, and in particular depending on the embodiment of the metering line, of the aqueous solution and, in particular, also depending on the selection of the reducing agent precursor(s) and of the reducing agent(s), it can be necessary for the metering line to be heated to other temperatures. When using an aqueous urea solution which is marketed for example also as "AdBlue" or as "Denoxium", temperatures of 350° C. or more and even, in particular, 400 to 450° C., in particular of approximately 420° C., have been proven to be particularly advantageous.

According to a further advantageous embodiment of the method according to the invention, at least one of the reducing agent precursors:

a) urea and
b) ammonium formate is included in at least one of the following components:
A) the substance mixture and
B) the aqueous solution.

It is thus possible, in particular, for the method according to the invention to lead to the formation of a substance mixture which includes urea and if appropriate also already ammonia. The substance mixture is particularly preferably supplied to a hydrolysis catalytic converter situated downstream for further hydrolysis and therefore for the formation of ammonia. It is preferable for substantially complete conversion to the reducing agent to be obtained in this way, in particular of 90% by weight and more, preferably of 95% by weight and more, particularly preferably of 98% by weight and more.

According to a further advantageous embodiment of the method according to the invention, the temperatures in the metering line are between 380 and 450° C.

These temperatures have proven to be particularly advantageous, since on one hand they lead to substantially complete evaporation of the aqueous solution, and on the other hand effectively prevent the excessive formation of depositions in the interior of the metering line. The temperature in the metering line is preferably approximately 380° C.

According to a further advantageous embodiment of the method according to the invention, the temperature along a length of the metering line is at most 25° C. above and below a mean temperature.

This temperature constancy particularly advantageously results in effectively preventing the formation of depositions. Corresponding trials have surprisingly shown that it is by no means necessary for a point with a temperature below the condensation temperature of one of the substances to be present for a deposition to be formed. It was in fact shown that even relatively slight temperature fluctuations of the metering line had the result that precipitation, in particular of urea, took place at the relatively cold points, which led to blockage of the metering line or to a reduction in the delivery capacity due to a reduction in the traversable cross section of the metering line. It was shown that a method in which as constant a temperature as possible is present across the length of the metering line is advantageous, since substantially no depositions are formed in this case. The method is to be selected, in particular, in such a way that a fluctuation range of approximately 50° C., that is to say a temperature of at most 25° C. above and below a mean temperature, is not exceeded across the length of the metering line.

According to a further advantageous embodiment of the method according to the invention, a heating power which varies by up to 500 W/s is used during the heating process.

A heating power of that type advantageously makes it possible to provide a particularly dynamic system in which the quantity of the gaseous substance mixture which is supplied can particularly advantageously be very quickly adapted to the requirements of the corresponding system.

According to a further advantageous embodiment of the method according to the invention, a quantity of 0.5 ml/s of the aqueous solution is delivered into the metering line.

This quantity has proven to be sufficient in order to cover even high demand peaks of the gaseous substance mixture or for example of a reducing agent which is contained in the gaseous substance mixture.

According to a further advantageous embodiment of the method according to the invention, the metering line has a traversable cross section of at most 20 square millimeters.

A maximum cross section of that type on one hand permits a highly dynamic method, so that large quantities of the gaseous substance mixture can be provided in a very short period of time, and on the other hand permits the construction of a small and compact system which can be used with only a small spatial requirement even in mobile applications, for example in exhaust systems of motor vehicles.

According to a further advantageous embodiment of the method according to the invention, the metering line is heated to a second temperature which is higher than the critical temperature at which complete evaporation of the aqueous solution takes place.

This can be carried out, in particular, if the metering line is blocked, in order to dissolve depositions in the metering line and/or allow the depositions to react. In this case, the second temperature is up to 600° C., preferably up to 800° C., particularly preferably up to 900° C. If the metering line is made of aluminum the second temperature is preferably 500° C.

According to a further advantageous embodiment of the method according to the invention, before the start of the evaporation, the temperature of the metering line is determined and aligned with other known temperatures.

It is possible in this case, in particular, to use the measurement values of measuring sensors which determine the temperature of other components, for example of an external thermometer, of a thermometer for determining the cooling water temperature, or the like.

According to a further advantageous embodiment of the method according to the invention, the heating of the metering line is carried out through the use of an electrical resistance heater, preferably through the use of a heat conductor, with the resistance of the resistance heater being determined before the start of heating, and the heating of the metering line taking place as a function of the determined resistance.

It is thereby possible, in particular, to warn the user of damage in the resistance heater, or the like.

According to a further advantageous embodiment of the method according to the invention, the heating power is monitored during the heating of the metering line.

In this case, the heating is preferably interrupted if, over a predefinable timespan, the heating power remains below a value which is dependent on the quantity of aqueous solution to be evaporated.

In the ongoing regulation, this indicates that there is a blockage or a reduced freely traversable cross section of the metering line. In this case, it is possible to initiate emergency measures, for example an operation of the device for heating the metering line to a second, higher temperature stage, in order to thereby clean the depositions in the metering line through the use of dissolution and/or reaction.

In an automobile, it is then possible, if the device for heating the metering line includes an electrical resistance heater, for a power supply to be taken from a generator of the automobile, for example an alternator, with the power preferably being tapped off before the regulation of the voltage of the alternator, since higher voltages are usually present in this case.

The details and advantages disclosed for the device according to the invention can also be transferred and applied to the method according to the invention. The details and advantages disclosed for the method according to the invention can also be transferred and applied to the device according to the invention.

Other features which are considered as characteristic for the invention are set forth in the appended claims.

Although the invention is illustrated and described herein as embodied in a method and a device for providing a gaseous substance mixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
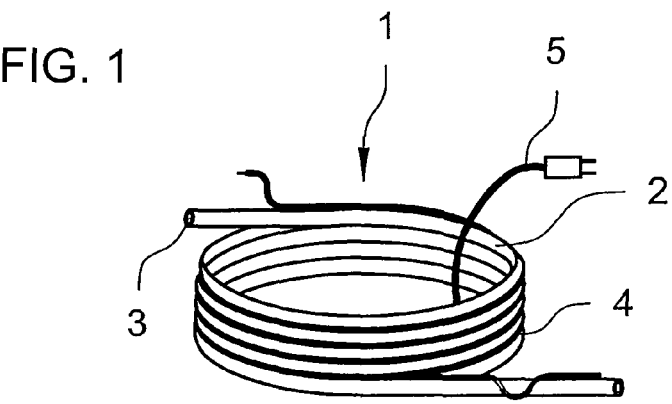
FIG. 1 is a diagrammatic, perspective view of a device for providing a gaseous substance mixture in a first embodiment of the invention.

Referring now to the figures of the drawings in detail and first, particularly, to FIG. 1 thereof, there is seen a diagrammatic illustration of a device 1 for providing a gaseous substance mixture including at least one of the following substances:

a) at least one reducing agent, and
b) at least one reducing agent precursor.

These are, in particular, the reducing agent ammonia and the reducing agent precursor urea. The device 1 includes a metering line 2 with a dispensing opening 3. Furthermore, a device 4 for heating the metering line 2 is provided. The metering line 2 can be heated with the device 4 above a first critical temperature, which is higher than the boiling temperature of water. The device 1 also includes a reservoir (not shown in FIG. 1) which can be flow-connected to the metering line 2. That is to say, in particular, that a fluid stored in the reservoir, such as for example an aqueous solution including at least one reducing agent precursor can, during operation, flow through the metering line 2 to the dispensing opening 3. Through the use of the device 1, a gaseous substance mixture can be provided which contains at least one reducing agent and/or at least one reducing agent precursor.

In the present exemplary embodiment, the device 4 for heating the metering line 2 is wound in spiral fashion together with the metering line 2. In this way, a fluid flowing through the metering line 2 is heated and ultimately evaporated. As a result, a gaseous substance mixture which contains at least one reducing agent precursor is dispensed through the dispensing opening 3. Depending on the selection of the temperature by using the device 4 for heating the metering line 2, at least partial thermolysis of the reducing agent precursor can even already take place in the metering line 2, so that the gaseous substance mixture dispensed through the dispensing opening also already contains reducing agent, such as for example ammonia, in addition to a reducing agent precursor, such as for example urea.

Furthermore, the device 1 for providing a gaseous substance mixture also includes a measuring sensor 5, through the use of which the temperature at least at one point of the metering line 2 can be measured. The measuring sensor 5 can, for example, be a conventional thermal element or a conventional thermoresistor. The device 1 and/or the individual components which require an electrical terminal preferably include a cable length for realizing the electrical terminals. A cable length is to be understood, in particular, to mean a cable connection which is at least half of a meter, preferably at least one meter long. This allows plug-type contacts to be formed in regions which, in particular in automobiles, are exposed to only a small extent to environmental influences such as water spray, stone impacts or the like.

Figure 2:
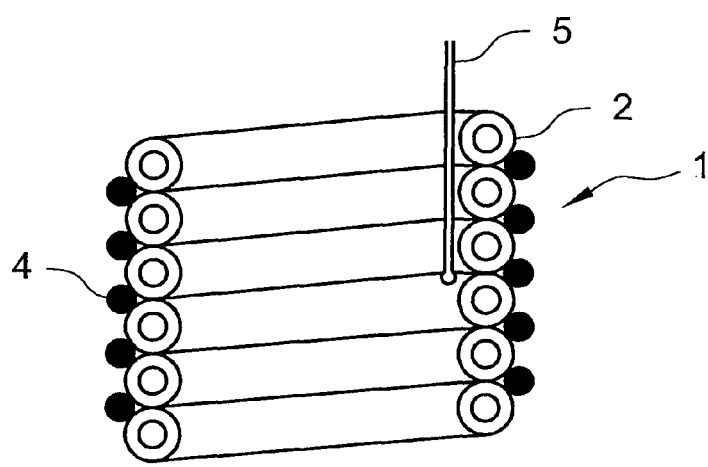
FIG. 2 is an enlarged, longitudinal-sectional view of the first embodiment of the device for providing a gaseous substance mixture.

FIG. 2 shows the device 1 of FIG. 1 in section. It is possible to clearly see the metering line 2, through which the aqueous solution including at least one reducing agent precursor can flow during operation, and the device 4 for heating the metering line 2. The metering line 2 can have a constant cross section, although it can also be variable, as in the present example. In this case, however, the traversable cross section of the metering line 2 is preferably between 0.75 mm$^2$ and 20 mm$^2$ and the traversable cross section is preferably in a region of approximately 3 mm$^2$. The traversable cross sections have been proven to be advantageous since, on one hand, fast and substantially complete evaporation of the aqueous solution is possible with a cross section of that type, and on the other hand, the cross section is large enough to ensure that the formation of depositions in the interior of the metering line 2 is substantially avoided. FIG. 2 also shows the measuring sensor 5 for determining the temperature of the metering line 2.

In this case, the device 4 for heating the metering line 2 is operated in such a way that, in operation, the temperature across the length of the metering line 2 is at most 5° C. above and below a mean temperature. The mean temperature substantially corresponds in this case to the first critical temperature. The metering line 2 is formed, in particular, from a copper alloy.

Figure 3:
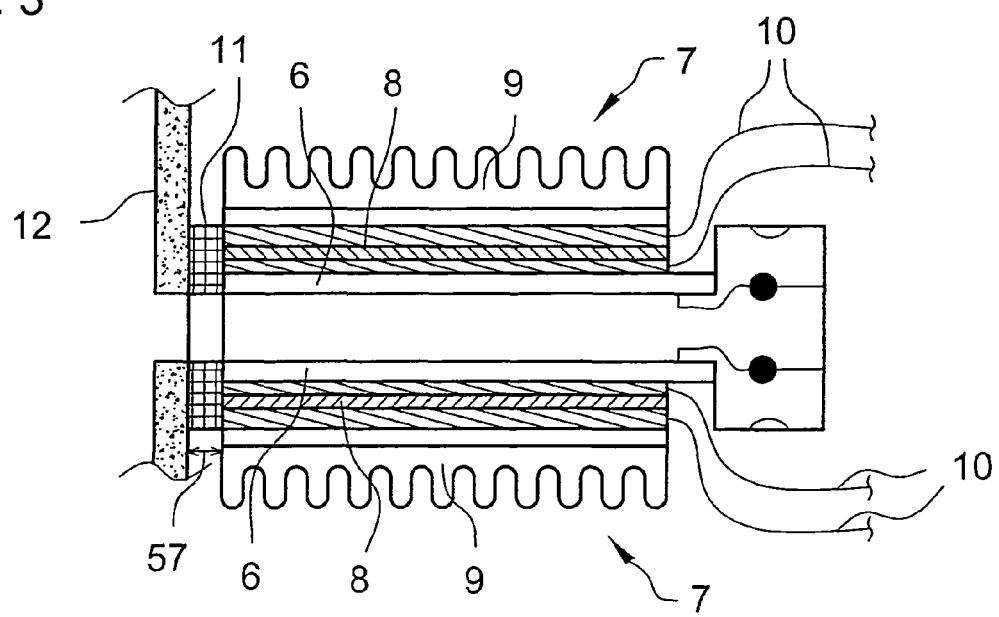
FIG. 3 is a fragmentary, longitudinal-sectional view of a delivery line for delivering an aqueous solution from a reservoir to a metering line.

FIG. 3 diagrammatically shows a delivery line 6, through which the metering line 2 can, in operation, be connected to a reservoir (not shown in FIG. 3). The delivery line 6 has a device 7 for temperature control. In this exemplary embodiment, the device 7 for temperature control includes in each case a plurality of Peltier elements 8 and a cooling body 9. The Peltier elements 8 are in each case provided with electrical terminals 10, through which they can be supplied with current. In this case, depending on the polarity of the current, the Peltier elements 8 are used for heating or for cooling, so that basic temperature control of the delivery line 6 can be obtained with the Peltier elements 8. The cooling body 9 serves, in particular, to radiate heat energy if the delivery line 6 is cooled by the Peltier element or elements 8.

The delivery line 6 can be connected to a further component through the use of a connecting unit 11. Depending on the construction of the device, the component can be the metering line 2 as already referred to above, or generally an evaporator unit 12. The metering line 2 can then be part of the evaporator unit 12. In general, the connecting unit 11 is formed at least partially from a material with a thermal conductivity of less than 10 W/m K (Watt per meter and Kelvin). The connecting unit 11 is formed, in particular, from a ceramic material and/or polytetrafluoroethylene (PTFE). The connecting unit 11 is, in particular, constructed in such a way that a temperature gradient of 40 K/mm (Kelvin per millimeter) and greater can be maintained over a length 57 of the connecting unit 11. This permits a method to be carried out in which the evaporator unit 12 and/or the metering line 2 has a considerably higher temperature than the delivery line 6. The evaporator unit can, for example, have a temperature of 300° C. or more, 400° C. or more or of 420° C. or more, and thereby lead to substantially complete evaporation of the aqueous solution within the evaporator unit 12, while the delivery line 6 has a temperature level of only 70° C. or more, 80° C. or more or 90° C. or more in order to ensure that the aqueous solution is not yet evaporated in the delivery line 6.

Figure 4:
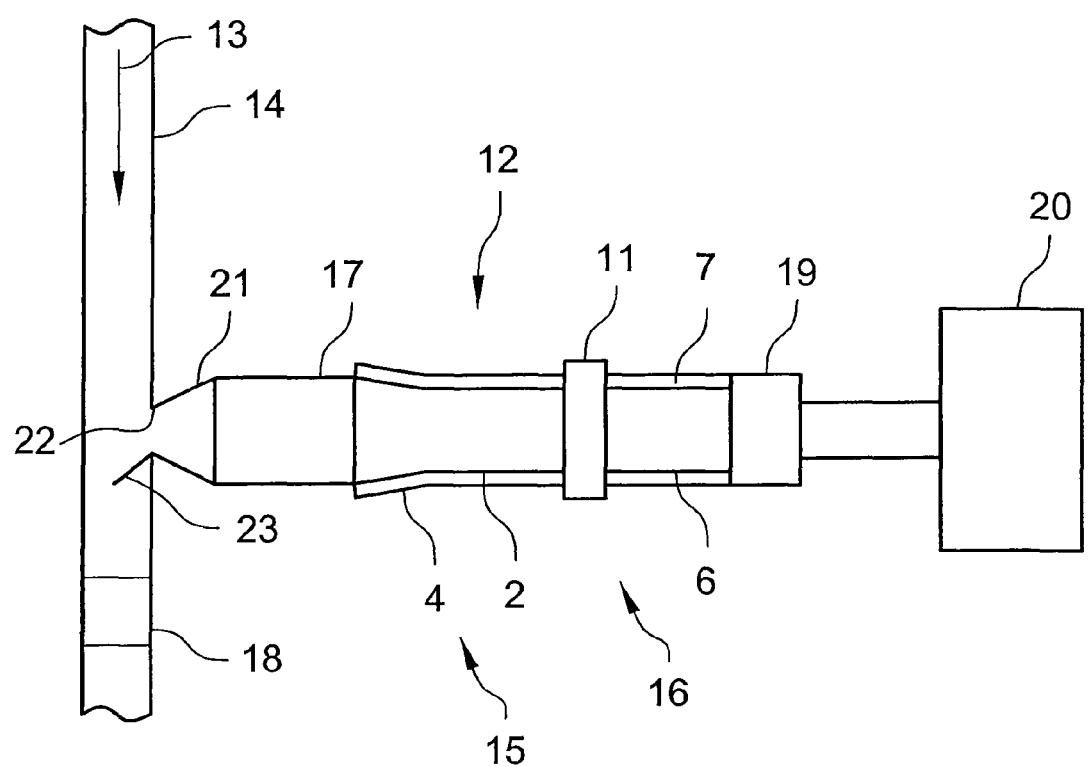
FIG. 4 is a plan view of a device for the selective catalytic reduction of nitrogen oxide in the exhaust gas of an internal combustion engine.

FIG. 4 diagrammatically shows a device 15 for treating exhaust gas 13 of a non-illustrated internal combustion engine. The exhaust gas 13 of the internal combustion engine flows through an exhaust line 14. The device 15 for treating the gases 13 of an internal combustion engine includes a reducing agent solution evaporator 16, a hydrolysis catalytic converter 17 and an SCR catalytic converter 18. An aqueous solution including a reducing agent precursor is evaporated in the reducing agent solution evaporator 16. Urea, in particular, is used as a reducing agent precursor. The reducing agent solution evaporator 16 includes, in this exemplary embodiment, an evaporator unit 12 including a metering line 2 which is heated by a device 4 for heating the metering line 2. The metering line 2 is connected through a connecting unit 11 to a delivery line 6. The delivery line 6 is surrounded by a device 7 for controlling the temperature of the delivery line 6. The device 7 can, for example, include one or more Peltier elements 8 and/or a cooling body 9, as shown above. The aqueous solution of at least one reducing agent precursor can be delivered by a delivery device 19 from a corresponding reservoir 20 into the delivery line 6. In the evaporator unit 12, a gas is provided which includes at least one reducing agent precursor such as, for example urea, and if appropriate also ammonia which has already been generated from the thermolysis of urea. The gaseous substance mixture is introduced into the hydrolysis catalytic converter 17 provided downstream of the reducing agent solution evaporator 16. The hydrolysis catalytic converter 17 is constructed in such a way that, in particular, urea is hydrolyzed to form ammonia through the use of a corresponding catalytically active coating which is applied to the hydrolysis catalytic converter 17. In general, the hydrolysis catalytic converter 17 serves for the hydrolysis of a reducing agent precursor to form a reducing agent. The gas which leaves the hydrolysis catalytic converter 17, which gas contains a reducing agent and is referred to as a reducing agent substance mixture, is metered into the exhaust line 14 through a dosing line 21. The dosing line 21 opens out into the exhaust line 14 at a dosing opening which is situated upstream of the SCR catalytic converter 18. A mixing device 23 in the form of a guide plate, which is provided downstream of the dosing opening 22 and upstream of the SCR catalytic converter 18, causes a mixture of the reducing agent substance mixture with the exhaust gas 13.

The SCR catalytic converter 18 therefore attains a mixture of reducing agent and exhaust gas which leads to a reduction of the nitrogen oxides contained in the exhaust gas 13 in the SCR catalytic converter 18. In this case, a quantity of reducing agent substance mixture is preferably provided which is such that as complete a conversion of the nitrogen oxides in the exhaust gas 13 as possible can take place in the SCR catalytic converter 18.

Figure 5:
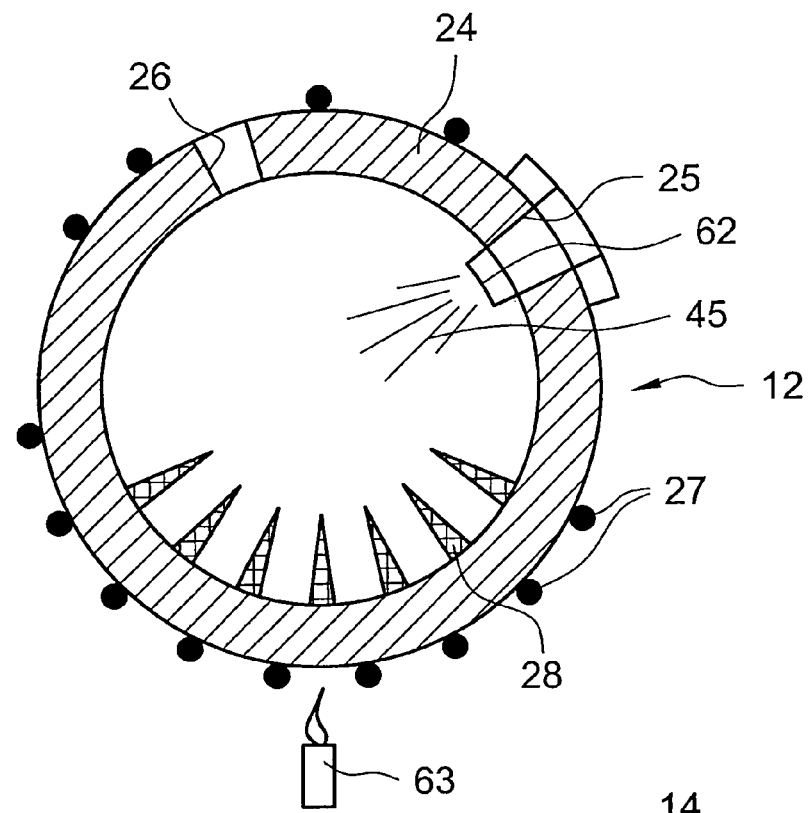
FIG. 5 is a cross-sectional view of a second exemplary embodiment of an evaporator unit.

FIG. 5 diagrammatically shows a further exemplary embodiment of an evaporator unit 12. This illustration shows the evaporator unit 12 in section. The evaporator unit 12 includes an evaporator chamber 24 which encompasses a substantially closed volume. In this exemplary embodiment, the evaporator chamber 24 has merely a first opening 25 for connecting a delivery line 6 (not shown in FIG. 5) for delivering the aqueous solution, and a second opening 26 for connecting a metering line 2 (not shown in FIG. 5) for discharging the gaseous substance mixture. A nozzle 62 is provided in the first opening 25 as a device for dosing an aqueous solution 45 into the evaporator chamber 24. The nozzle 62 serves to dose the aqueous solution 45 into the evaporator chamber 24. The evaporator unit 12 additionally has a device for heating the evaporator chamber 24. In the present exemplary embodiment, the device is formed by corresponding heat conductors 27 which are in contact with the evaporator chamber 24. As is shown in this case, the heat conductors 27 can have an asymmetric construction, that is to say a higher density of heat conductors per unit area is provided in regions which are situated substantially opposite the first opening 25 than in regions which are not situated substantially opposite the first opening 25. Furthermore, the device cumulatively includes a device 63 for burning hydrocarbons, such as for example a burner. A burner of that type can also be suitable for carrying out a flameless combustion of hydrocarbons.

The evaporator chamber 24 is preferably formed from a material including at least one of the following materials: a) copper; b) aluminum; c) noble steel; d) a nickel-based material and e) chrome-nickel steel. The volume of the evaporator chamber 24 is preferably 1.5 to 10 cm$^3$. In operation, the heat conductor 27 is preferably operated with a heating power of up to approximately one kilowatt per second, with the maximum heating power being fixed as a function of the application. In passenger vehicles, the maximum heating power is preferably approximately 500 to 700 W/s, and in trucks or utility vehicles, preferably approximately 1200 to 1500 W/s. The heat capacity of the evaporator chamber 24 is preferably less than 120 J/K, particularly preferably 100 to 110 J/K. The first opening 25 and the second opening 26 preferably enclose an angle of 30 to 70°. The aqueous solution 45 is preferably delivered at up to 150 ml/min into the evaporator chamber 24, preferably at up to 100 ml/min, particularly preferably at up to 30 ml/min. In the region of the second opening 26, the evaporator chamber 24 preferably has a device with which an infiltration of droplets into the second opening 26 can be avoided. The device is, in particular, a device with which a gas film situated between the droplet and the wall of the evaporator chamber 24 can be penetrated. The device is, in particular, projections of the walls or the like. Structures 28 can likewise be provided in this region.

Furthermore, the evaporator chamber 24 has, in the interior, one or more of the above-mentioned structures 28 which serve to produce a larger surface for evaporating the aqueous solution. The structures 28 are illustrated as being relatively large in the present exemplary embodiment. However, the structures 28 can also be a structured surface which is provided, for example, by applying a corresponding coating to the inner surface of the evaporator chamber 24. The structures 28 can alternatively or additionally also include macroscopic structures which have a structure amplitude of a few millimeters or even more. In general, the structures 28 are to be understood as a device for increasing the wetting capacity of the surface of the evaporator chamber 24.

Figure 6:
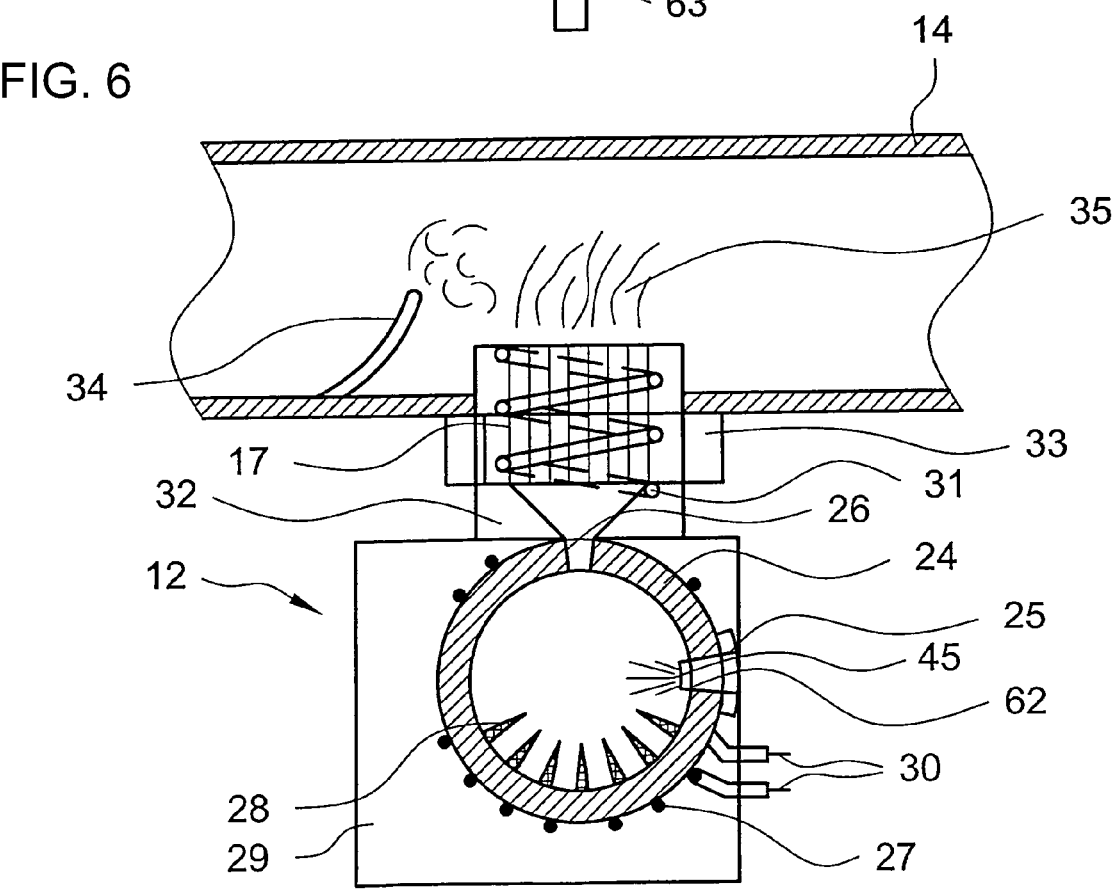
FIG. 6 is a fragmentary, cross-sectional view, on a reduced scale, of a device for providing a reducing agent.

FIG. 6 diagrammatically shows the first exemplary embodiment of the evaporator chamber 24 connected to an exhaust line 14. In this case, the evaporator chamber 24 is provided with a casing 29. The casing 29 is preferably formed from a corresponding thermal insulator which reduces heat losses to the environment. The device 27 for heating the evaporator chamber 24 can be connected through the use of heat conductor terminals 30 to a non-illustrated current source.

The evaporator unit 12 is connected through the use of the second opening 26 to a hydrolysis catalytic converter 17. The hydrolysis catalytic converter 17 has a device 31 for controlling the temperature of the hydrolysis catalytic converter 17. The device 31 is composed, in the present exemplary embodiment, of a corresponding heating wire which is wound around the hydrolysis catalytic converter 17. A corresponding casing 32, which is disposed around the hydrolysis catalytic converter 17 constitutes, in particular, thermal insulation of the hydrolysis catalytic converter 17 with respect to the environment in order to minimize as far as possible any occurring heat losses. In the present exemplary embodiment, the hydrolysis catalytic converter is connected directly to the exhaust line 14 by virtue of projecting into the latter. A corresponding bore, into which the hydrolysis catalytic converter 17 or its casing 32 can be inserted in as sealed a manner as possible, is formed in the exhaust line 14. A corresponding connecting device 33 produces as sealed a connection as possible between the hydrolysis catalytic converter 17 and the exhaust line 14. A passive mixing device is also provided in the form of a guide plate 34, through the use of which a reducing agent substance mixture 35, which leaves the hydrolysis catalytic converter 17, is mixed with the exhaust gas flowing in the exhaust line 14.

In operation, the evaporator unit 12 serves to produce a gaseous substance mixture from an aqueous solution which contains urea as a reducing agent precursor. The gaseous substance mixture generated in the evaporator unit 12 contains at least urea and if appropriate also already ammonia which has been generated by thermolysis of the corresponding urea. The substance mixture is conducted through the second opening 26 into the hydrolysis catalytic converter 17 in which substantially complete hydrolysis of the urea takes place to form ammonia. In this case, a reducing agent substance mixture 35 which includes ammonia is generated in the hydrolysis catalytic converter. A method is particularly preferred in which 98% and more of the urea is ultimately converted to ammonia.

Figure 7:
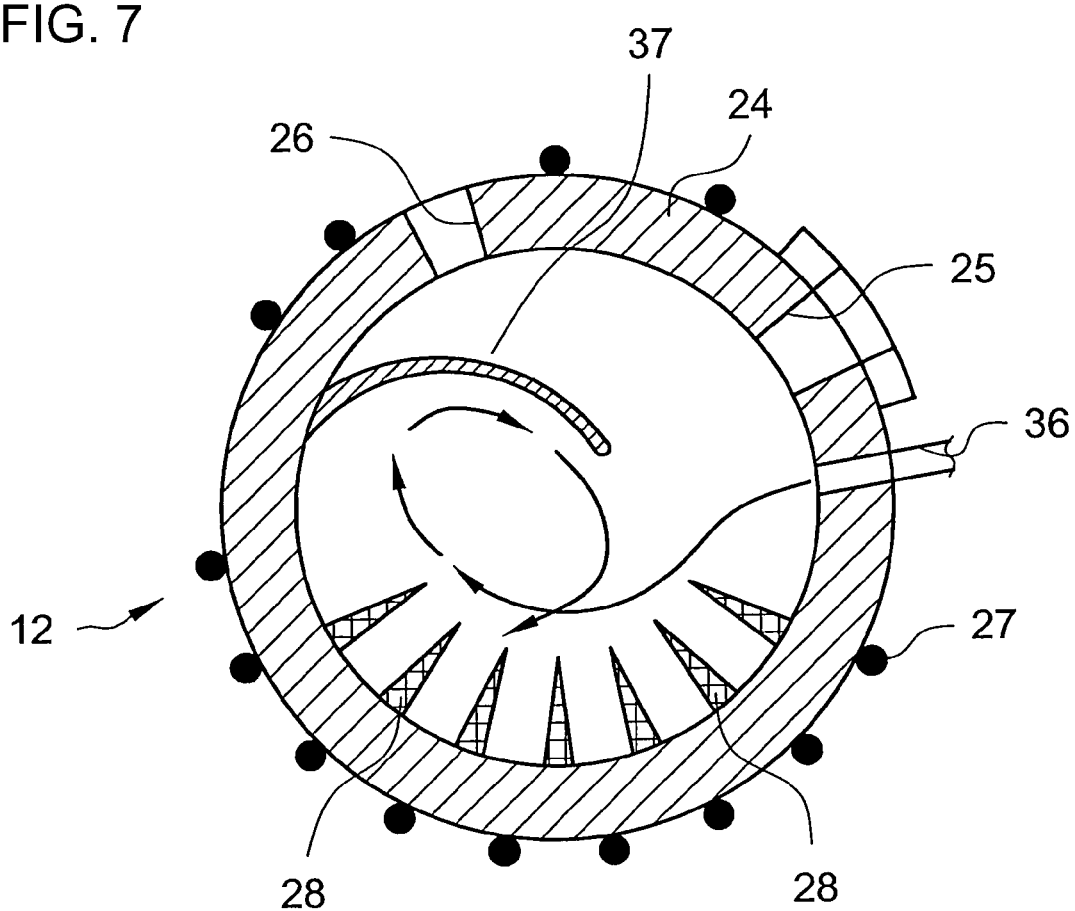
FIG. 7 is a cross-sectional view of an alternative embodiment of the evaporator unit.

FIG. 7 diagrammatically shows an alternative embodiment of the evaporator unit of FIGS. 5 and 6. In contrast to the first exemplary embodiment described above, this alternative embodiment additionally has a third opening 36. In operation, exhaust gas can be introduced into the evaporator chamber 24 in a continuous or pulsatile fashion through the third opening 36. It is possible in this way to obtain an improved distribution of the urea in the generated gas in comparison to the first exemplary embodiment. Furthermore, an evaporator unit 12 of this type can also be used for evaporating solid urea, since water is introduced into the evaporator chamber 24 by the exhaust gases of the internal combustion engine which are introduced through the third opening 36. That water can later be used in the hydrolysis catalytic converter 17 for the hydrolysis of the urea to form ammonia.

Figure 8:
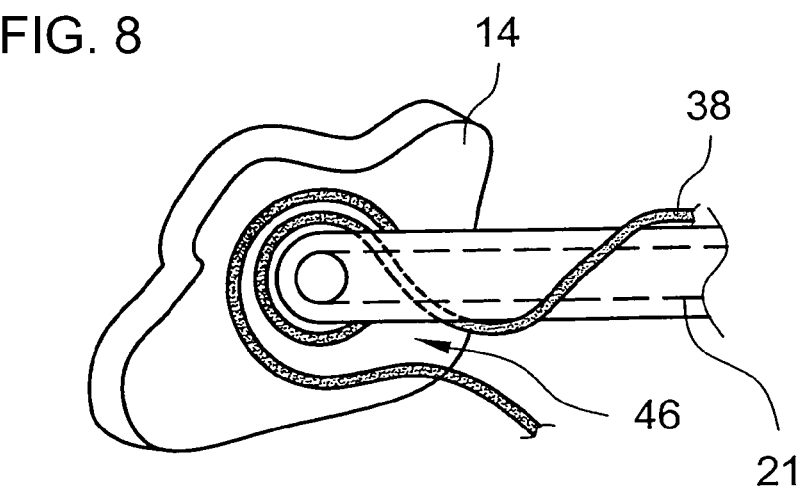
FIG. 8 is a fragmentary, perspective view of a portion of an opening-out point of a dosing line into an exhaust line.

FIG. 8 diagrammatically shows an opening-out point, mouth or orifice of a dosing line 21 into the exhaust line 14 as a part of a corresponding metering unit 46. In this case, the dosing line 21 is surrounded by a heat conductor 38 which is also formed around the opening-out point of the dosing line 21 into the exhaust line 14.

Figure 9:
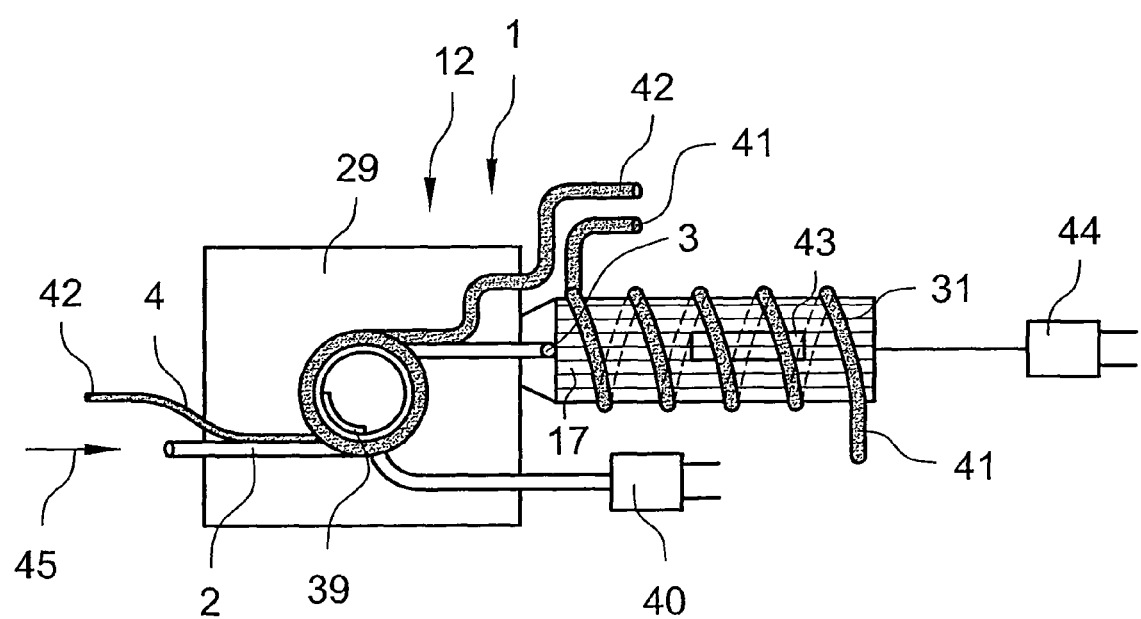
FIG. 9 is a cross-sectional view of an exemplary embodiment of a device for providing a gaseous substance mixture.

FIG. 9 diagrammatically shows, at a first intersection, a further possibility of a device 1 for providing a gaseous substance mixture including a reducing agent. The device 1 includes a metering line 2, around which a corresponding device 4 for heating the metering line 2 is wound, or which is wound together with the device 4. The metering line 2 and the device 4 for heating the metering line 2 are formed together in a common casing 29. A first temperature measuring sensor 39 is formed within the winding of the metering line 2. The first temperature measuring sensor 39 can be connected through the use of a first connecting element 40 to a corresponding control unit (which is not shown in FIG. 9). The evaporator unit 12 is connected at the dispensing opening 3 of the metering line 2 to a hydrolysis catalytic converter 17. The hydrolysis catalytic converter 17 has a coating which catalyses the hydrolysis of urea to form ammonia. The hydrolysis catalytic converter 17 is surrounded by a device 31 for controlling the temperature of the hydrolysis catalytic converter. The device 31 includes a correspondingly formed heating wire. The device 31 for controlling the temperature of the hydrolysis catalytic converter 17 can be connected in an electrically conductive manner to a corresponding power supply through the use of corresponding first heat conductor terminals 41. This correspondingly applies to the device 4 for heating the metering line 2. The device 4 can be provided with a corresponding power supply through the use of corresponding second heat conductor terminals 42. The hydrolysis catalytic converter 17 has a second temperature measuring sensor 43 which can be connected through the use of a corresponding second connecting element 44 to a non-illustrated control unit. The temperature within or on the hydrolysis catalytic converter 17 can be determined through the use of the second temperature measuring sensor 43.

In operation, an aqueous urea solution 45 is delivered into the metering line 2. The device 4 for heating the metering line 2 serves to heat the metering line 2 and thereby evaporate the aqueous urea solution and, if appropriate, depending on the temperature control, an at least partial thermolysis of the contained urea takes place to form ammonia. The corresponding gaseous substance mixture is introduced through the dispensing opening 3 into the hydrolysis catalytic converter 17, in which hydrolysis, preferably substantially complete hydrolysis of the contained urea takes place to form ammonia. A corresponding reducing agent substance mixture 35 leaves the hydrolysis catalytic converter 17. The reducing agent substance mixture 35 can be introduced into an exhaust line 14 of an exhaust system of an internal combustion engine. A method is preferable in this case in which the temperatures of the evaporator unit 12 and/or of the hydrolysis catalytic converter 17 are monitored through the use of the temperature measuring sensors 39, 43, and both components 12, 17 can be heated by the corresponding devices 4, 31.

Figure 10:
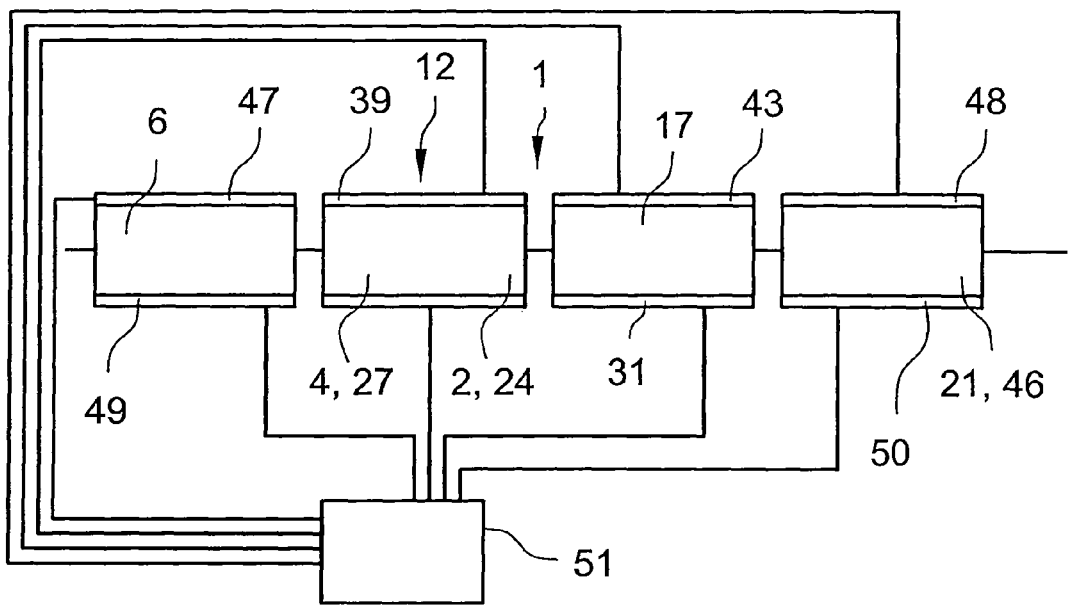
FIG. 10 is a block diagram of a device for providing a gaseous substance mixture.

FIG. 10 diagrammatically shows a device 1 for providing a gaseous substance mixture 35 including at least one reducing agent. The device 1 includes, sequentially, a delivery line 6, through the use of which an aqueous solution is delivered from a non-illustrated reservoir into an evaporator unit 12. The evaporator unit 12 is adjoined by a hydrolysis catalytic converter 17, and the latter is adjoined by a dosing line 21 for metering the corresponding substance mixture to a non-illustrated exhaust line 14 or by a metering unit 46 for metering the reducing agent substance mixture to the exhaust line 14. The evaporator unit 12 has a third temperature measuring sensor 47. The temperature of or in the delivery line 6 can be measured with the third temperature measuring sensor 47. The dosing line 21 and/or the metering unit 46 optionally has a fourth temperature measuring sensor 48, with which the temperature of the dosing line 21 and/or of the metering unit 46 or the temperature in the dosing line 21 and/or in the metering unit 46 can be measured. The evaporator unit 12 has a device 4 for heating the metering line 2 and/or a device 27 for heating the evaporator chamber 24. The hydrolysis catalytic converter 17 can optionally, alternatively or in addition to the device 4, 27, have a device 31 for controlling the temperature of the hydrolysis catalytic converter 17. Optionally, alternatively or in addition, the delivery line 6 has a temperature control device 49, through the use of which the temperature of the delivery line 6 can be controlled. It is particularly possible, advantageous and inventive in this case to use one or more Peltier elements. The dosing line 21 and/or the metering unit 46 have a metering temperature control device 50, through the use of which the temperature of the dosing line 21 and/or of the metering unit 46 can be controlled. The use of at least one Peltier element is also advantageous in this case. A temperature measuring sensor 43 for the hydrolysis catalytic converter 17 and a temperature measuring sensor 39 for the metering line 2, are also shown.

All of the temperature control devices 4, 27, 31, 49, 50 and all of the temperature measuring sensors 39, 43, 47, 48 which are provided are connected to a control unit 51. The control unit 51 carries out a regulation of the temperature in a regulating loop which includes at least one device 4, 27, 31, 49, 50 for temperature control and at least one temperature measuring sensor 39, 43, 47, 48. The number of temperature measuring sensors 39, 43, 47, 48 is preferably greater than the number of devices 4, 27, 31, 49, 50 for controlling the temperature of the components 6, 2, 24, 17, 21, 46. The control unit 51 is preferably connected to a controller of the internal combustion engine or is integrated therein. The data of the controller of the internal combustion engine and the operating parameters of the internal combustion engine can advantageously be incorporated in the control of the evaporation and/or of the delivery to the evaporator unit 12.

Figure 11:
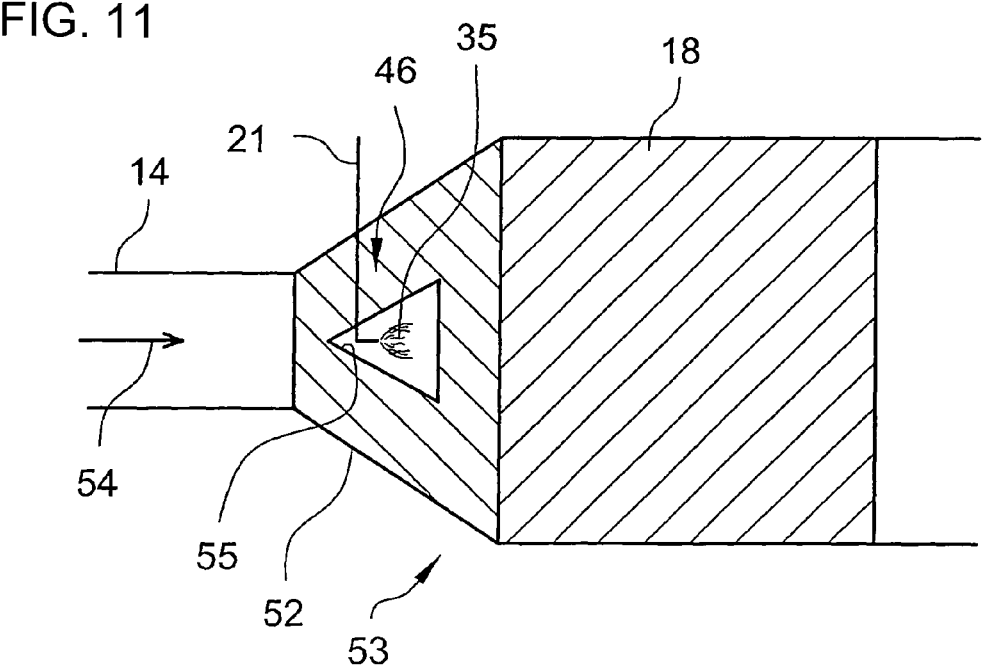
FIG. 11 is a fragmentary, longitudinal-sectional view of an example of a possible metering unit for metering a reducing agent substance mixture to the exhaust gas.

FIG. 11 diagrammatically shows a portion of a device for providing a gaseous substance mixture. A honeycomb body 52 with channels which can be traversed by a fluid, is provided in an exhaust line 14 upstream of an SCR catalytic converter 18. The honeycomb body 52 is part of a corresponding mixing device 53. The honeycomb body 52 is constructed in such a way that it can be traversed by the exhaust gas at least partially at an angle with respect to a main flow direction of the exhaust gas. In this case, the main flow direction 54 is indicated by a corresponding arrow in FIG. 11. In the present exemplary embodiment, the honeycomb body 52 has a conical construction. The honeycomb body has, in particular, a relatively large cutout 55 which is free from channels. The dosing line 21, as part of the metering unit 46, opens out into the cutout 55. The reducing agent substance mixture 35 is introduced through the dosing line 21 in operation.

Figure 12:
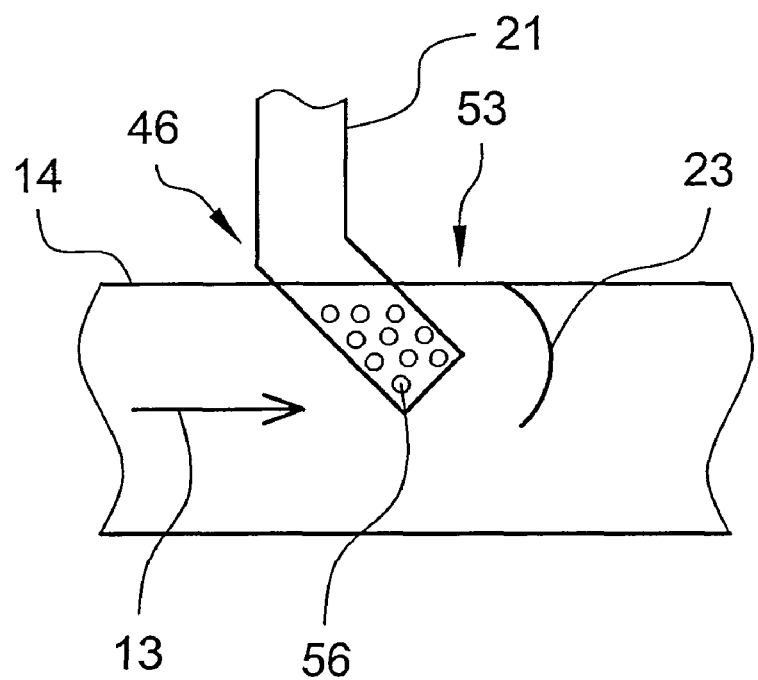
FIG. 12 is a fragmentary, longitudinal-sectional view of a further example of a possible metering unit for metering the reducing agent substance mixture to the exhaust gas.

FIG. 12 diagrammatically shows an example of a metering unit 46 with a dosing line 21 for metering the reducing agent substance mixture into an exhaust line 14. In this case, the dosing line 21 extends through the wall of the exhaust line 14 in a curved state. The dosing line 21 has perforations 56 in a region which projects into the exhaust line 14. In this case, the curvature or the curved entry of the dosing line 21 into the exhaust line 14 is not strictly necessary. The dosing line 21 could equally well enter into the exhaust line 14 perpendicularly or straight. A guide plate 23, which is additionally provided in this case, leads to a further improved mixture of the reducing agent substance mixture with the exhaust gas 13 in the exhaust line 14.

Figure 13:
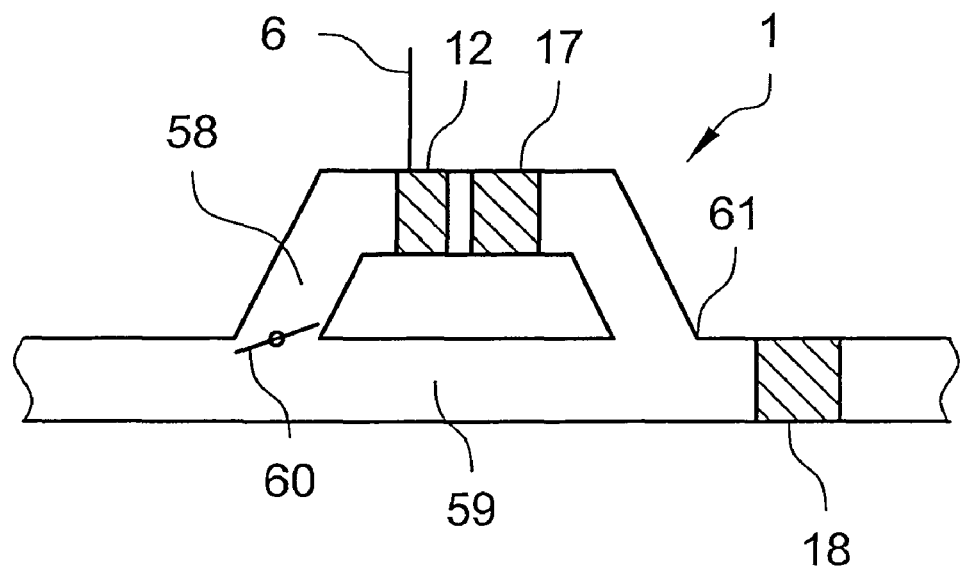
FIG. 13 is a fragmentary, longitudinal-sectional view of an exemplary embodiment of a device for treating the exhaust gas of an internal combustion engine.

FIG. 13 diagrammatically shows an embodiment of the device 1 for treating the exhaust gas of a non-illustrated internal combustion engine. In this case, the evaporator unit 12 and the hydrolysis catalytic converter 17 are provided in a first exhaust branch 58. A distribution of the exhaust gas between the first exhaust gas branch 58 and a second exhaust gas branch 59 is obtained by using a device 60 for flow guidance. The SCR catalytic converter 18 is provided downstream of a mouth or opening-out point 61 of the first exhaust branch 58 into the second exhaust branch 59.

Figure 14:
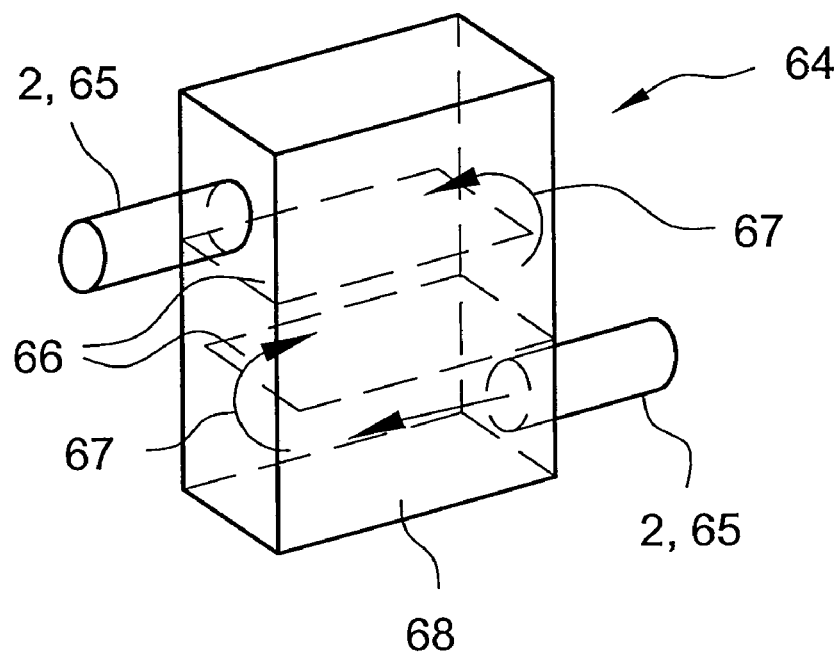
FIG. 14 is a perspective view of a device for depositing droplets.

The evaporator unit 12 preferably has a device 64 for depositing droplets. The device 64 can, for example, be provided within the metering line 2 or in or downstream of the second opening 26 of the evaporator chamber 24. FIG. 14 shows an exemplary embodiment of a device 64 of that type for depositing droplets. The device 64 is connected to the metering line 2 or generally to a line 65 through which vapor passes. Should droplets still be present in the vapor, they are deposited in the present example by the action of inertia. One or more impact plates 66, which force the flow to undergo deflections 67, are provided in the device 64. The impact plate 66 and/or a housing 68 of the device 64 are heated, so that deposited droplets are likewise evaporated. Instead of the device 64 for depositing droplets which is shown in this case, it is also possible to alternatively or cumulatively take other measures. For example, the metering line 2 or the line 65 can have narrowed cross sections, projections, deflections or the like in regions.

Figure 15:
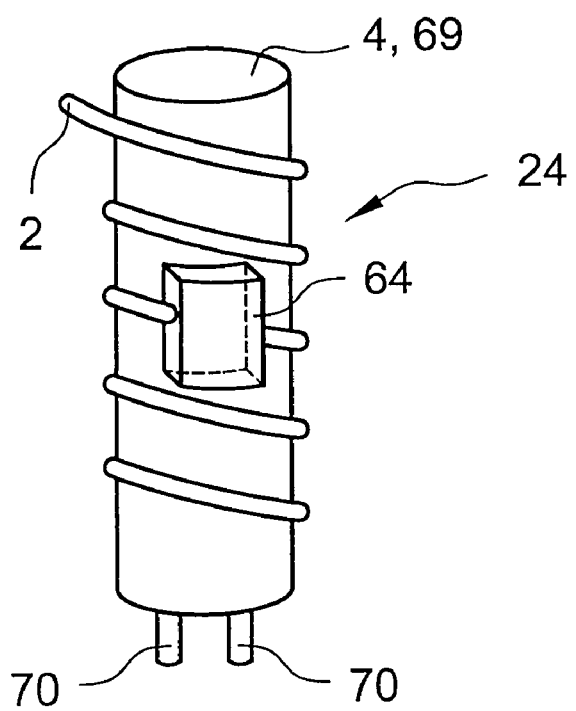
FIGS. 15 to 18 are perspective views of exemplary embodiments of evaporator units.

FIG. 15 diagrammatically shows a further exemplary embodiment of an evaporator unit 12, in which a metering line 2 can be heated by a device 4 for heating the metering line 2. In this case, the device 4 for heating the metering line 2 includes a bar-shaped heating element 69 which can be connected through the use of electrical terminals 70 to a power source. A device 64 for depositing droplets, which is provided in the metering line 2, can be heated due to contact with the rod-shaped heating element 69.

Figure 16:
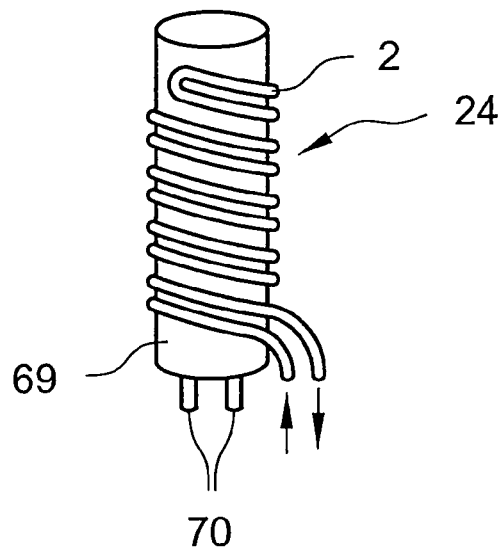

FIG. 16 diagrammatically shows a further exemplary embodiment of an evaporator unit 12 in which the metering line 2 is wound, in the form of a loop, twice around the bar-shaped heating element 69.

Figure 17:
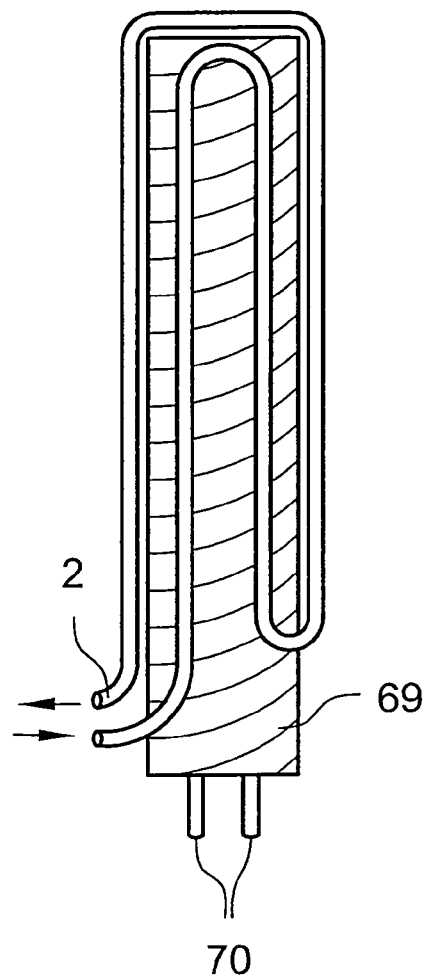
Figure 18:
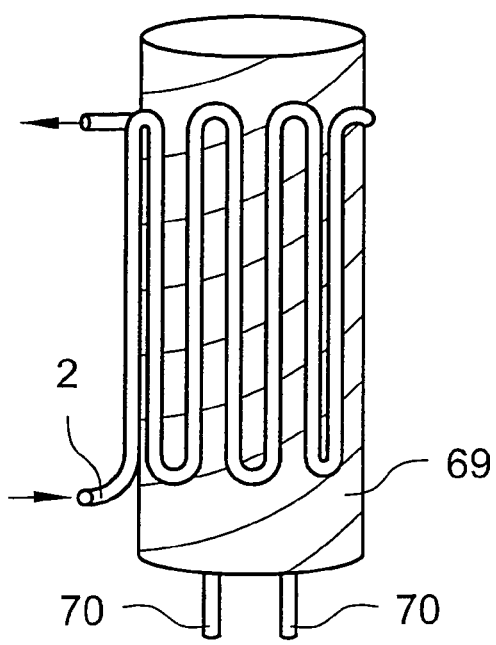

FIGS. 17 and 18 show exemplary embodiments of evaporator units 12 in which the metering line 2 is not wound around the longitudinal axis of the bar-shaped heating element 69 but is fastened in loops to the bar-shaped heating element 69. A materially-joined connection between the metering line 2 and the bar-shaped heating element 69, in particular a brazed connection, is fundamentally preferred.

Figure 20:
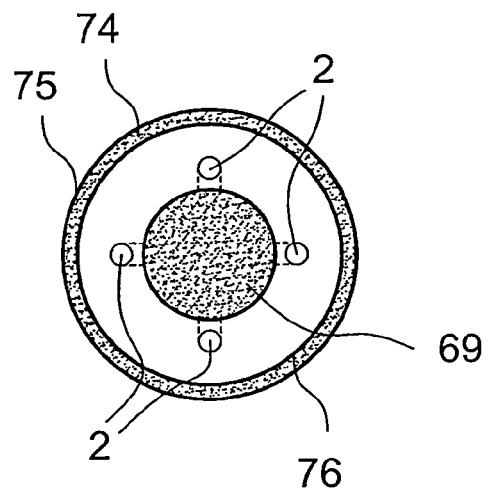
FIGS. 19 and 20 are respective perspective and cross-sectional views of a further exemplary embodiment of a device for providing a gaseous substance mixture.
Figure 19:
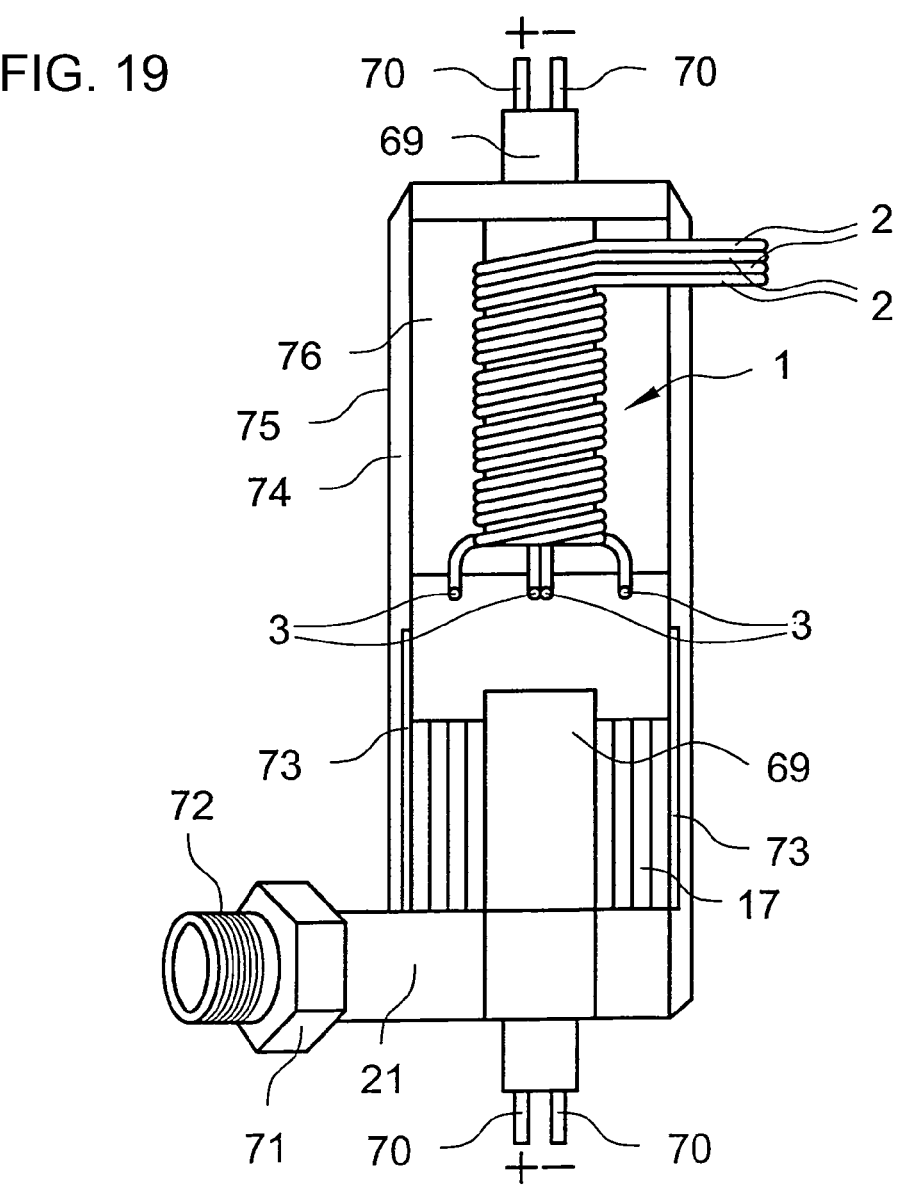

FIGS. 19 and 20 diagrammatically show a further exemplary embodiment of a device 1 for providing a gaseous substance mixture including at least one of the following substances: a) a reducing agent, preferably ammonia, and b) at least one reducing agent precursor, in particular urea, having a hydrolysis catalytic converter 17. The device 1 includes at least one metering line 2, in the present exemplary embodiment four metering lines 2, which are wound in spiral fashion around a bar-shaped heating element 69. Each of the metering lines 2 has a respective dispensing opening 3, through which, in operation, a gaseous substance mixture which includes a reducing agent, is dispensed. The respective dispensing openings 3 are distributed, so as to be distributed substantially uniformly on a circle. The metering lines 2 are connected to a non-illustrated reservoir 20 from which an aqueous solution 45 of at least one reducing agent precursor is delivered into the metering line 2 by a delivery device 19. The metering lines 2 and the heating element 69 are part of a corresponding reducing agent solution evaporator 16.

The hydrolysis catalytic converter 17, which is disposed downstream of the dispensing openings 3, can likewise be heated by a bar-shaped heating element 69. In one advantageous refinement, only one bar-shaped heating element 69 is provided. The heating element 69 is in thermal contact both with the metering line or lines 2 and with the hydrolysis catalytic converter 17. In the present exemplary embodiment, the hydrolysis catalytic converter 17 is embodied as an annular honeycomb body. The hydrolysis catalytic converter 17 is adjoined downstream by a dosing line 21, through which, in operation, the gas flow including at least one reducing agent can be introduced into the exhaust line 14. A mechanical connection to the exhaust line 14 can be produced by a connecting device 71. A thermal insulation 72 is also provided, through which the hydrolysis catalytic converter 17 is thermally decoupled from the exhaust line 14. A heat shield 73 is also provided, through which the hydrolysis catalytic converter 17 is protected from a radiation of heat. Furthermore, air gap insulation 74, which likewise serves as thermal insulation, is provided between an outer housing 75 and an inner housing 76.

FIG. 20 shows a cross section through that region of the metering lines 2 which can be seen encircling the rod-shaped heating element 69.

Figure 21:
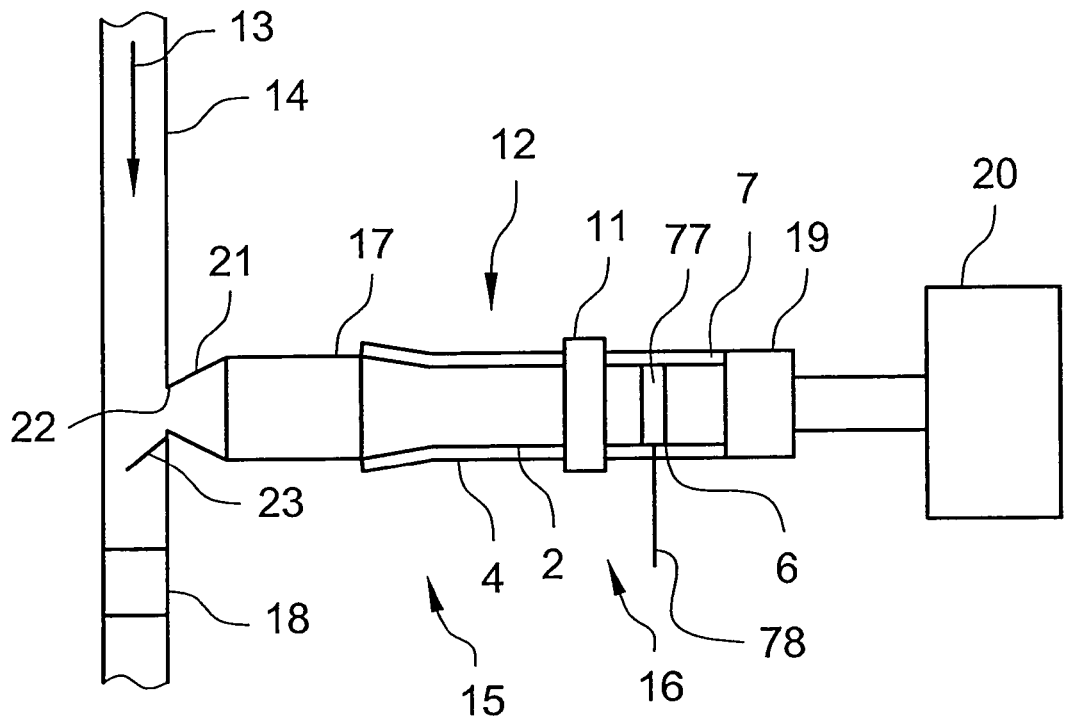
FIG. 21 is a fragmentary, plan view of a further exemplary embodiment of a device for treating exhaust gas.

FIG. 21 diagrammatically shows a further exemplary embodiment of a device 15 for treating exhaust gas 13. In contrast to the embodiment in FIG. 4, a valve 77 is provided in the delivery line 6. The valve 77 serves for dosing the aqueous solution 45 into the evaporator unit 12. The valve 77 can be actuated through the use of a control terminal 78.

Figure 22:
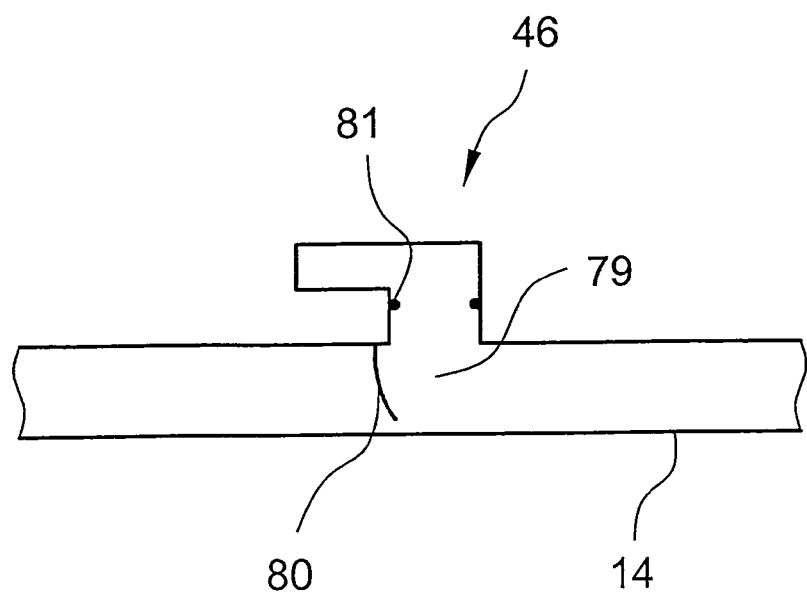
FIG. 22 is a fragmentary, plan view of a portion of an opening-out region of a metering unit into the exhaust line.

FIG. 22 diagrammatically shows an opening-out or mouth region 79 of a metering unit 46 into the exhaust line 14. In this case, the exhaust line 14 and/or the metering unit has a shield or screen 80 which, in operation, produces a dead zone or calming zone of the exhaust gas flow, and consequently a region of reduced pressure, in the opening-out region 79, and thereby ensures that no exhaust gas is pushed into the dosing unit 46. The metering or dosing unit 46 also has a temperature sensor 81 which includes an annular thermoresistor. Should depositions form in the region, then the temperature sensor 81 can be connected to a non-illustrated power source in order to thereby bring about a temperature increase to a second nominal temperature, for example of 600° C. or 800° C., and cause a dissolution or reduction of the depositions.

Figure 23:
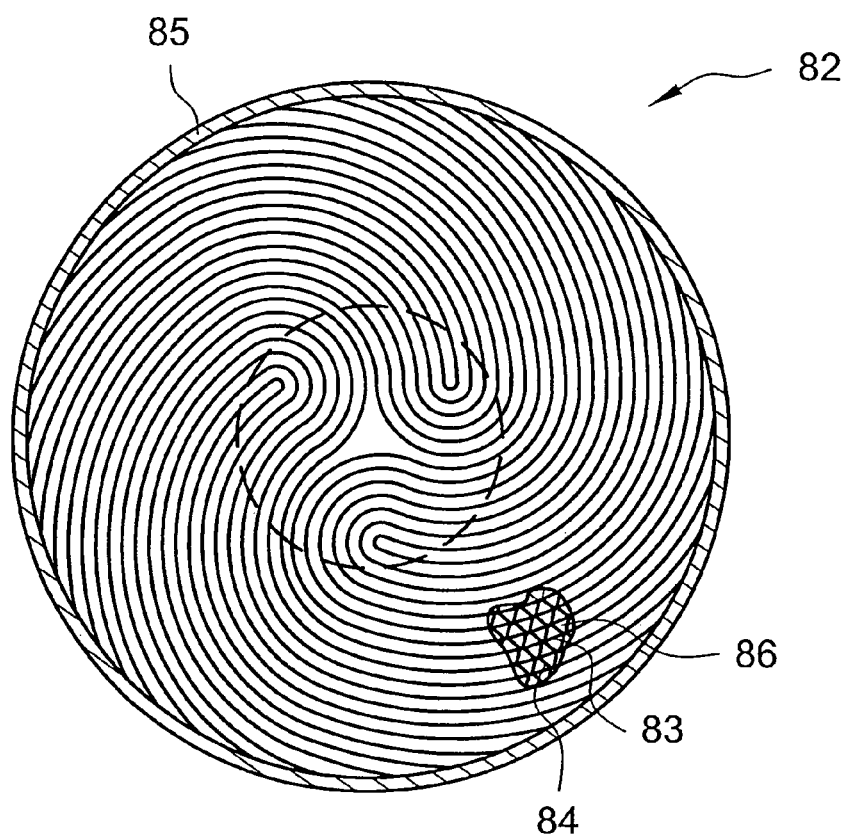
FIGS. 23 and 24 are cross-sectional views of examples of honeycomb bodies acting as catalyst carrier bodies.

FIG. 23 diagrammatically shows a cross section through a honeycomb body 82 which can be used both as a hydrolysis catalytic converter 17 and also as an SCR catalytic converter 18, noting that it is necessary in this case for other catalytically active coatings to be applied. The honeycomb body 82 is constructed from smooth metallic layers or sheets 83 and corrugated metallic layers or sheets 84 which, in this exemplary embodiment, are layered to form three stacks and are then wound with one another. The honeycomb body 82 also includes a casing tube 85 which closes off the honeycomb body 82 from the outside. The smooth layers 83 and corrugated layers 84 form channels 86 through which the exhaust gas 13 can flow.

Figure 24:
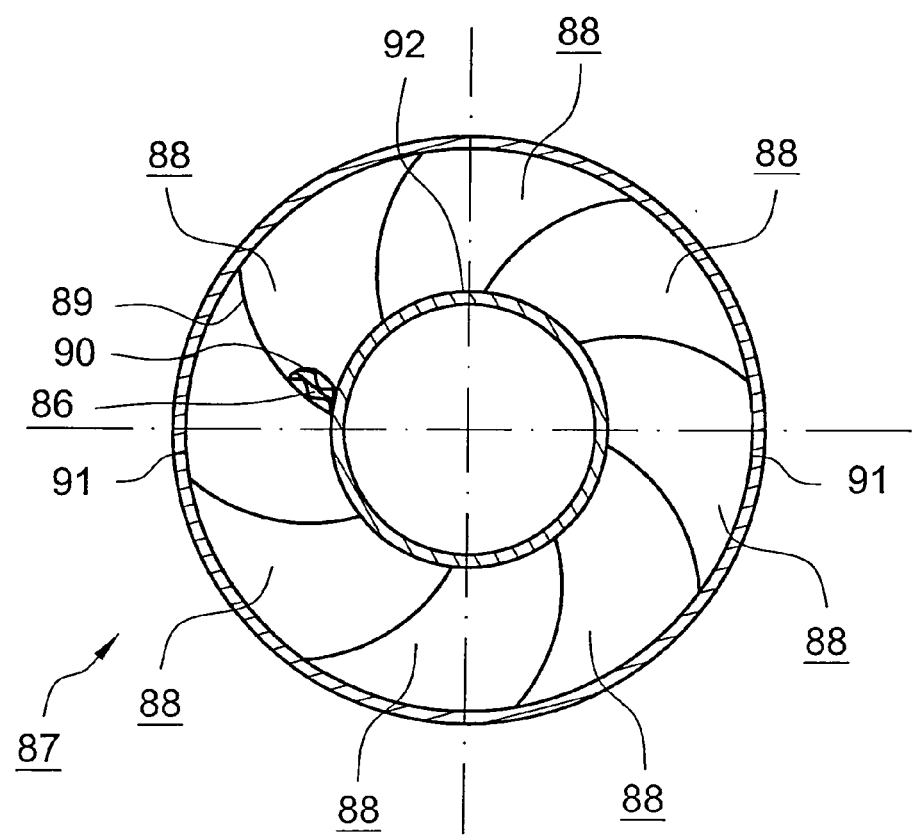

FIG. 24 shows a further example of a honeycomb body 87 which has an annular construction and can be used both as a hydrolysis catalytic converter 17 and also as an SCR catalytic converter 18, noting that it is necessary in this case for other catalytically active coatings to be applied. The honeycomb body 87 is constructed from layers 88 which have smooth sections 89 and corrugated sections 90 that are folded onto one another and form channels 86 through which the exhaust gas 13 can flow. The honeycomb body 87 is closed off through the use of an outer casing tube 91 and an inner casing tube 92.

In the case, in particular, of a metering line 2 which is heated by a device 4, 69, it is fundamentally advantageous to provide heating from the other side, in addition to single-sided heating. It is, for example, possible for further heating elements to be provided which enclose the metering line from the outside. It is fundamentally advantageous if, at a certain cross section of the metering line 2, the temperature over the periphery differs from a mean temperature at most by +25° C. or −25° C. in operation.

The hydrolysis catalytic converter 17 is fundamentally also a tube which is provided with a coating that catalyses the hydrolysis, in particular, of urea to form ammonia, or else a casing tube having at least one structured metallic layer which is applied on the inside to the outer periphery and which preferably has a freely traversable cross section radially in its interior which is at least 20% of the entire cross section of the casing tube. These embodiments are preferably heated from the outside.

Before the provision of a reducing agent upstream of the SCR catalytic converter 18 commences, the process is fundamentally as follows:

it is initially checked as to whether a current supply or fuel supply is ensured for the temperature control and/or heating device 4, 27, 31, 49, 50, 63, 69;

if it is determined that the current and/or fuel supply is ensured, then the evaporator unit 12 and if appropriate the hydrolysis catalytic converter 17 are heated in each case to a predetermined nominal temperature, in particular a metering line 2 is heated to approximately 360 to 400° C. and/or an evaporator chamber 24 is heated to approximately 250 to 350° C.;

an aqueous solution 45 is delivered in parallel to the evaporator chamber 24, in particular to the connecting unit 11, with it being possible on one hand for a volume of aqueous solution 45 to be delivered which substantially corresponds to the volume of the delivery line 6, and on the other hand for a corresponding sensor, which operates for example on the basis of conductivity measurement, to be provided at a corresponding point, for example on, in or adjacent the connecting unit 11;

the temperature of the SCR catalytic converter 18 or of the exhaust line 14 is then determined, in particular measured and/or calculated from the data of an engine controller.

If the temperature of the SCR catalytic converter 18 is above a predefinable limit value, in particular the "light-off" temperature of the SCR catalytic converter 18, the evaporator unit 12 is supplied with the aqueous solution 45. If the evaporator unit 12, the metering line 2 and/or the evaporator chamber 24 are still substantially at their operating temperature, then the above-specified diagnosis steps can be omitted.

In operation, the heating power imparted to the evaporator unit 12 correlates with the delivery quantity of the aqueous solution 45. This means, in particular, that it is checked as to what level of nominal heating power is required for the evaporation of the respective delivery quantity. If the measured actual heating power for a timespan is below the nominal heating power, then a warning is output to the user, since a reduction of the cross section of the metering line 2 and/or of the dosing line 21 could then be present.

It is also advantageous, at regular, predefinable time intervals, to heat the evaporator unit 12, the metering line 2, the evaporator chamber 24, the hydrolysis catalytic converter 17, the dosing line 21 and/or the metering unit 46 to a temperature which is above the normal operating temperature, in order to thereby dissolve any depositions which may be present.

When the evaporation is ended, which occurs for example when the internal combustion engine is switched off, the aqueous solution 45 can be returned from the metering line 2. Before the return delivery from the metering line 2, the delivery of aqueous solution 45 is preferably firstly suspended, with the evaporator unit 12, the metering line 2 and/or the evaporator chamber 24 however still being heated to the usual temperature in order to thereby carry out complete evaporation and to thereby prevent any impurities present in the evaporator unit 12, the metering line 2 and/or the evaporator chamber 24 from passing into the delivery line 6 during the return delivery. After a certain time has elapsed, the return delivery can be initiated by the delivery device. A valve is advantageously provided on or adjacent the connecting unit 11. Air can be sucked in during the return delivery through the use of the valve. The return delivery fundamentally takes place until the delivery line 6 is substantially emptied into the reservoir 20.

In the event of intense changes in the delivery quantity of the aqueous solution 45 which is to be delivered, which can for example be attributed to a sharply-rising concentration of nitrogen oxides in the exhaust gas of the internal combustion engine, situations can occur in which the evaporator unit 12 is not capable of immediately evaporating a considerably higher quantity of aqueous solution 45, since the correspondingly increased heating cannot take place so quickly. In this case, it is preferable to increase the delivery quantity of the aqueous solution 45 only to such an extent that complete evaporation is still possible.

The quantity of reducing agent to be dispensed, and consequently also the quantity of aqueous solution 45 which is to be evaporated, can be determined as a function for example, of at least one of the following conditions:
 a) the nitrogen oxide concentration in the exhaust gas;
 b) a forecast nitrogen oxide generation which preferably occurs when the exhaust gas passes the SCR catalytic converter 18;
 c) the maximum quantity of reducing agent which can be converted directly by the SCR catalytic converter 18.

The reservoir 20, the delivery line 6, the evaporator unit 12, the metering line 2, the evaporator chamber 24 and/or the hydrolysis catalytic converter 17 can be constructed to be in thermal contact, for example with the fuel tank of the internal combustion engine. The fuel tank usually has a heater, for frost protection reasons, which can then also provide frost protection for the above-specified components.

According to a further advantageous aspect of the invention, a device 1 is described for providing a gaseous substance mixture including at least one of the following substances:
 a) at least one reducing agent, and
 b) at least one reducing agent precursor.

In this case, a reservoir 20 for an aqueous solution 45 including at least one reducing agent precursor is provided. The reservoir 20 can be flow-connected to an evaporator chamber 24. Furthermore, a device for dosing the aqueous solution 45 is provided in the evaporator chamber 24, with the device 27, 63 for heating the evaporator chamber 24 being provided. The evaporator chamber 24 can be heated with the device 27, 63 to a temperature greater than or equal to a critical temperature at which the aqueous solution is at least partially evaporated. According to one advantageous refinement of the device 1, the device for dosing the aqueous solution 45 includes at least one nozzle 62. The evaporator chamber 24 advantageously has a substantially closed volume which has only a first opening 25 for connecting a delivery line 6 for the aqueous solution 45, and a second opening 26 for connecting a metering line 2 for discharging the gaseous substance mixture. According to one advantageous refinement of the device 1, the evaporator chamber 24 encompasses a substantially closed volume which has only a first opening 25 for connecting a delivery line 6 for the aqueous solution, a second opening 26 for connecting a metering line 2 for discharging the gaseous substance mixture, and a third opening 36 for metering exhaust gas 14.

A further advantageous refinement of the device provides that the device 27, 63 for heating the evaporator chamber 24 includes at least one of the following components:
 a) an electrical resistance heater 27, and
 b) a device 63 for burning a fuel.

It is also advantageous for the evaporator chamber 24 to be substantially spherically symmetrical. In this case, the evaporator chamber 24 preferably has a radius of 2 mm to 25 mm. It is also advantageous for the evaporator chamber 24 to have a volume of 30 to 4000 mm$^3$. The device 27, 63 for heating the evaporator chamber can impart a heating power of up to 5 kW. A delivery line 6 for delivering the aqueous solution 45 is also advantageously provided. The delivery line 6 connects the evaporator chamber 24 to a reservoir 20 and a delivery device 19 is provided, through which a fluid can be delivered through the delivery line 6. According to a further advantageous embodiment of the device, the latter is constructed in such a way that, in operation, the temperature of the evaporator chamber 24 is at most 25° C. above and below a mean temperature. It is also advantageous for the evaporator chamber 24 to have, at least in partial regions, a device 28 for increasing the wetting capacity of the surface. The device 28 can, in particular, include a structuring of the inner surface (projections or the like) of the evaporator chamber 24.

A method is also described for providing a gaseous substance mixture including at least one of the following substances:
 a) at least one reducing agent, and
 b) at least one reducing agent precursor.

An aqueous solution 45 of at least one reducing agent precursor is delivered into an evaporator chamber 24, with the evaporator chamber 24 being heated in such a way that the aqueous solution 45 is completely evaporated to form the gaseous substance mixture. The method can advantageously be further developed in such a way that the evaporator chamber 24 has a substantially closed volume which has only a first opening 25 for connecting a delivery line 6 for the aqueous solution 45, and a second opening 26 for connecting a metering line 2 for discharging the gaseous substance mixture.

Alternatively, the evaporator chamber 24 can encompass a substantially closed volume which has only a first opening 25 for connecting a delivery line 6 for the aqueous solution 45, a second opening 26 for connecting a metering line 2 for discharging the gaseous substance mixture, and a third opening 36 for metering exhaust gas 14.

The method can advantageously be further developed in such a way that the heating is regulated. The evaporator chamber 24 is, in particular, heated to a mean temperature of 250 to 300° C. It is also advantageous for the evaporator chamber 24 to be heated to a mean temperature in such a way that the temperature does not at any point of the evaporator chamber 24 deviate from a mean temperature by more than +25° C. or −25° C.

A device 15 for treating the exhaust gas of an internal combustion engine is also described. The device 15 includes a reducing agent solution evaporator 16, a hydrolysis catalytic converter 17, which is connected to the reducing agent solution evaporator 16, for the hydrolysis of, in particular, urea to form ammonia, and an SCR catalytic converter 18 for the selective catalytic reduction of nitrogen oxides (NOx). The reducing agent solution evaporator 16 includes an evaporator unit 12 for providing a gaseous substance mixture including at least one of the following substances:

a) at least one reducing agent precursor, and
b) a reducing agent.

An aqueous solution 45 including at least one reducing agent precursor can be evaporated through the use of the evaporator unit 12. The SCR catalytic converter 18 is provided in the exhaust line 14, with the reducing agent solution evaporator 16 and the hydrolysis catalytic converter 17 being provided outside of, and in such a way that they can be connected to, the exhaust line 14.

The device 15 can advantageously be refined in such a way that a delivery line 6 for connecting the evaporator unit 12 is connected to a reservoir 20 for the aqueous solution 45. In this case, the delivery line 6 and the evaporator unit 12 are connected to one another through the use of a connecting unit 11. The connecting unit 11 is at least partially made from a material with a thermal conductivity of less than 10 W/m K (Watt per meter and Kelvin), preferably of less than 2 W/m K, particularly preferably of less than 1 W/m K, in particular of 0.2 W/m K. It is also advantageous for the connecting unit 11 to be constructed from at least one material including at least one of the following materials:

a) a ceramic material, and
b) polytetrafluoroethylene (PTFE).

It is also advantageous for the connecting unit 11 to be constructed in such a way that a temperature gradient of 40 K/mm (Kelvin per millimeter) and greater can be maintained over a length of the connecting unit 11. In addition, the hydrolysis catalytic converter 17 has a heat capacity of at most 60 J/K (Joule per Kelvin). The volume of the hydrolysis catalytic converter 17 is 100 ml or less.

The hydrolysis catalytic converter preferably includes a casing tube, with the casing tube not being incorporated in the determination of the above-specified heat capacity. At least one at least partially structured metallic layer is preferably provided in the casing tube. A free region without the provision of any at least partially structured layers, is preferably provided in the inner region. The free region encompasses at least 20 or even 50% by area of the cross-sectional area of the casing tube.

The hydrolysis catalytic converter 17 advantageously has a cell density of less than 600 cpsi (cells per square inch), preferably of 400 cpsi and less, particularly preferably of 300, 200 or 100 cpsi and less. The hydrolysis catalytic converter 17 is preferably mechanically connected to the exhaust line 14. The hydrolysis catalytic converter 17 is preferably thermally decoupled from the exhaust line 14.

According to a further advantageous embodiment of the device 15, at least one bar-shaped heating element 69 is provided, through the use of which at least one of the following components can be heated:

a) the hydrolysis catalytic converter 17, and
b) at least parts of the evaporator chamber 24.

It is also advantageous that the temperature of at least one of the following components can be controlled:

a) at least parts of the delivery line 6;
b) the hydrolysis catalytic converter 17;
c) at least parts of the evaporator unit 12;
d) a dosing line 21 for metering the generated ammonia to the exhaust system; and
e) a metering unit 46, through the use of which the hydrolysis catalytic converter 17 can be connected to the exhaust gas line 14.

It is also advantageous that a device 4, 7, 27, 31, 49, 50 for temperature control is provided and the device includes at least one of the following components:

a) a heating wire;
b) a Peltier element 8;
c) a cooling body 9;
d) a bar-shaped heating element 69; and
e) a device 63 for burning a fuel.

It is also advantageous that at least one of the following components has a coating which catalyses the hydrolysis of urea:

a) at least parts of the connecting unit 11;
b) at least parts of a metering line 2 for metering the gaseous substance mixture to the hydrolysis catalytic converter 17;
c) at least parts of the evaporator unit 12;
d) at least parts of a dosing line 21 for metering the generated reducing agent to the exhaust system; and
e) at least parts of a metering line 46, through the use of which the hydrolysis catalytic converter 17 can be connected to the exhaust line 14.

It is also advantageous that a metering unit 46 is provided, through the use of which the hydrolysis catalytic converter 17 can be flow-connected to an exhaust line 14 of the internal combustion engine. The metering unit 46 includes, in particular, a passive mixing device, through the use of which the introducible substances can be mixed with the exhaust gas. The mixing device preferably includes at least one of the following components:

a) a guide plate 34; and
b) a honeycomb body 52 which is constructed in such a way that the exhaust gas 13 can flow through it at least partially at an angle with respect to the main flow direction 45 of the exhaust gas.

The honeycomb body 52 advantageously has channels and apertures which can be traversed by a fluid and connect adjacent channels to one another.

In one advantageous refinement of the device 15, at least one of the following components:

a) the metering unit 46; and
b) the exhaust line 14;

is constructed in such a way that, in operation, the opening-out region of the metering unit 46 into the exhaust line 14 forms a flow calming zone or dead zone.

According to a further advantageous embodiment of the device 15, thermal insulation 72 is provided downstream of the hydrolysis catalytic converter 17. The thermal insulation 72 is preferably disposed directly adjacent the hydrolysis catalytic converter 17.

According to a further advantageous embodiment of the device 15, at least one of the following components has at least one temperature sensor:
a) the metering unit 46;
b) the hydrolysis catalytic converter 17;
c) the SCR catalytic converter 18;
d) the evaporator unit 12;
e) the metering line 2;
f) the evaporator chamber 24; and
g) a dosing line 21 for metering the generated reducing agent to the exhaust line 14.

The temperature sensor can preferably be connected to a power supply, so that it can also be used for heating the corresponding component a) to g).

According to a further advantageous embodiment of the device 15, a delivery device 19 is provided, through the use of which the aqueous solution 45 can be delivered from a reservoir to the evaporator unit 12. The delivery device 19 preferably includes at least one pump, preferably a delivery pump. According to one advantageous embodiment, the pump can build up a delivery pressure which is greater than the highest possible exhaust gas pressure on the metering unit 46 and/or on the dosing line 21 during operation of the internal combustion engine. According to a further advantageous embodiment of the device 15, at least one valve for dosing the aqueous solution 45 is provided between the delivery device 19 and the evaporator unit 12.

An advantageous method for treating the exhaust gas of an internal combustion engine is also to be described in this case. The method includes at least the following steps:
a) providing at least one of the following substances:
A) a1) reducing agent; and
B) a2) gaseous substance mixture including at least one reducing agent precursor;
b) hydrolysis of the at least one reducing agent precursor, with a reducing agent substance mixture 35 being obtained; and
c) subjecting an SCR catalytic converter 18 to the reducing agent substance mixture 35 and the exhaust gas 13 for the at least partial selective catalytic reduction of nitrogen oxides (NOx) contained in the exhaust gas.

A mixture of the reducing agent substance mixture 35 with at least parts of the exhaust gas 13 takes place after step b).

The method can advantageously be refined in such a way that, in step a), an evaporation of an aqueous solution 45 including at least one reducing agent precursor takes place in an evaporator unit 12. It is also preferable that step b) at least partially takes place in a hydrolysis catalytic converter 17.

According to a further advantageous embodiment of the method, the temperature of at least one of the following components is regulated:
a) at least parts of the evaporator unit 12;
b) the hydrolysis catalytic converter 17;
c) a delivery line 6 for delivering the aqueous solution 45;
d) a metering line 2 for metering the gaseous substance mixture to the hydrolysis catalytic converter 17;
e) a dosing line 21 for metering the generated reducing agent to the exhaust system; and
f) a metering unit 46, through the use of which the hydrolysis catalytic converter 17 can be flow-connected to an exhaust gas line 14 of the internal combustion engine.

In this case, the connection is provided upstream of the SCR catalytic converter 18. It is also advantageous that the temperature of at least one of the following components is controlled:
a) at least parts of the evaporator unit 12;
b) the hydrolysis catalytic converter 17;
c) a delivery line 6 for delivering the aqueous solution 45 to an evaporator unit 12;
d) a metering line 2 for metering the gaseous substance mixture to the hydrolysis catalytic converter 17;
e) a dosing line 21 for metering the generated reducing agent to the exhaust system; and
f) a metering unit 46, through the use of which the hydrolysis catalytic converter 17 can be flow-connected to an exhaust gas line 14 of the internal combustion engine.

A further embodiment of the method includes the delivery of the aqueous solution 45 through a delivery line 6 to the reducing agent solution evaporator 16. It is advantageous in this case if the aqueous solution 45 can be returned through the delivery line 6. According to a further advantageous embodiment of the method, up to 2.5 ml of aqueous solution 45 are evaporated within one second.

According to a further advantageous embodiment of the method, the temperature of at least one of the following components is determined before the start of a temperature control measure:
a) the hydrolysis catalytic converter 17;
b) the evaporator unit 12;
c) a dosing line 21 for metering the generated reducing agent to the exhaust line 14; and
d) a metering unit 46, through the use of which the hydrolysis catalytic converter 17 can be flow-connected to the exhaust line 14 of the internal combustion engine, and is aligned with at least one further temperature of another component. According to a further advantageous embodiment of the method, the evaporation of the aqueous solution 45 takes place only if the temperature alignment results in the determined temperature level and the temperature of the other component differing at most by a predefinable difference value.

The device 1 according to the invention and the method according to the invention advantageously permit the complete evaporation of an aqueous solution including urea, and subsequent hydrolysis to form a substance mixture including ammonia. The substance mixture is advantageously metered as a reducing agent into an SCR catalytic converter 18. The fact that the evaporation is carried out outside the exhaust system permits the use of considerably smaller hydrolysis catalytic converters 17, so that the device according to the invention is space-saving and cost-saving in comparison with conventional devices for providing a reducing agent for the selective catalytic reduction of nitrogen oxides.

The invention claimed is:

1. A device for providing a gaseous substance mixture including at least one of the following substances:
a) at least one reducing agent, or
b) at least one reducing agent precursor, the device comprising:
a reservoir for an aqueous solution including at least a reducing agent precursor;
at least one metering line;
a delivery device for delivering the aqueous solution from said reservoir into said at least one metering line; and
a device for heating said at least one metering line above a critical temperature being greater than the boiling temperature of water and above 300° C. without mixing with exhaust gas;

said at least one metering line having a dispensing opening for dispensing the gaseous substance mixture.

2. The device according to claim 1, wherein said at least one metering line has an inner surface with a surface roughness of 8 to 12 microns.

3. The device according to claim 1, wherein said at least one metering line is made of a material with a coefficient of thermal conduction of more than 200 W/m K (Watt per Meter and Kelvin).

4. The device according to claim 1, wherein said at least one metering line has at least one change of direction of at least 90°.

5. The device according to claim 1, wherein said device for heating includes at least one of the following elements:
   a) an electrical resistance heater;
   b) a heat transfer device for utilizing waste heat of at least one other component;
   c) at least one Peltier element; or
   d) a device for burning a fuel.

6. The device according to claim 1, wherein said at least one metering line has a length, and a temperature across said length of said at least one metering line is at most 25 degrees Celsius above and below a mean temperature during operation.

7. The device according to claim 1, wherein said at least one metering line is formed from a material including aluminum.

8. The device according to claim 1, wherein said at least one metering line has a heat capacity of at least 150 J/K (Joule per Kelvin).

9. The device according to claim 1, wherein said at least one metering line is at least partially provided with a coating which catalyses hydrolysis of a reducing agent precursor to form a reducing agent.

10. The device according to claim 1, which further comprises a hydrolysis catalytic converter disposed along with said at least one metering line in a common heatable body.

11. A method for providing a gaseous substance mixture including at least one of the following substances:
   a) at least one reducing agent, or
   b) at least one reducing agent precursor, the method comprising the following steps:
   delivering an aqueous solution of at least a reducing agent precursor from a reservoir into a metering line;
   heating the metering line above a critical temperature being above 300° C. without mixing with exhaust gas, to completely evaporate the aqueous solution to form the gaseous substance mixture; and
   dispensing the gaseous substance mixture.

12. The method according to claim 11, which further comprises setting temperatures in the metering line at a mean temperature between 380° C. and 450° C.

13. The method according to claim 11, which further comprises setting a temperature along a length of the metering line at most at 25 degrees Celsius above or below a mean temperature.

14. The method according to claim 11, wherein the metering line has at least one change of direction of at least 90°.

15. The method according to claim 11, which further comprises heating the metering line to another temperature being higher than the critical temperature at which complete evaporation of the aqueous solution takes place.

16. The method according to claim 11, which further comprises:
   carrying out the step of heating the metering line with an electrical resistance heater,
   determining a resistance of the resistance heater before starting heating; and
   carrying out the heating of the metering line as a function of the determined resistance.

17. The device according to claim 1, which further comprises an electrical resistance heater being in contact with said metering line and having a heat conductor connected to said metering line for obtaining a required temperature profile constancy.

18. The device according to claim 17, wherein said heat conductor has closely-wound windings surrounding said metering line.

19. The device according to claim 17, wherein said metering line and said heat conductor are wound together.

20. The device according to claim 19, wherein said wound-together metering line and heat conductor form a spiral.

21. The device according to claim 17, wherein said metering line and said heat conductor have a materially-joined connection therebetween.

* * * * *